(12) United States Patent
Simek

(10) Patent No.: US 7,418,773 B2
(45) Date of Patent: Sep. 2, 2008

(54) PUNCH AND DRILL MACHINE FOR A STRUCTURAL ANGLE

(75) Inventor: Eric Christopher Simek, Kankakee, IL (US)

(73) Assignee: Peddinghaus Corporation, Bradley, IL (US)

( * ) Notice: Subject to any disclaimer, the term of this patent is extended or adjusted under 35 U.S.C. 154(b) by 46 days.

(21) Appl. No.: 11/699,708

(22) Filed: Jan. 30, 2007

(65) Prior Publication Data
US 2008/0181732 A1 Jul. 31, 2008

(51) Int. Cl.
*B21D 53/00* (2006.01)
*B23Q 37/00* (2006.01)
*B23P 11/00* (2006.01)

(52) U.S. Cl. .................... 29/34 R; 29/26 A; 29/430; 83/667

(58) Field of Classification Search ............ 29/563, 29/564, 565, 26 A, 34 R, 430, 429, 431, 711, 29/791; 83/405, 635, 663, 667, 681, 682, 83/698.91
See application file for complete search history.

(56) References Cited

U.S. PATENT DOCUMENTS

| | | | | |
|---|---|---|---|---|
| 2,164,616 A | * | 7/1939 | Manny | ......................... 29/564 |
| 3,720,125 A | | 3/1973 | Scott | |
| 3,722,337 A | | 3/1973 | Brolund et al. | |
| 4,631,996 A | | 12/1986 | Magnuson | |
| 4,761,876 A | * | 8/1988 | Kosmowski | .................... 483/1 |
| 5,063,804 A | | 11/1991 | Magnuson | |
| 5,394,782 A | | 3/1995 | Magnuson et al. | |
| 6,519,831 B2 | * | 2/2003 | Futamura et al. | ............ 29/564.7 |
| 6,708,385 B1 | * | 3/2004 | Lemelson | ..................... 29/563 |
| 7,343,660 B1 | * | 3/2008 | Lemelson | ..................... 29/563 |
| 2002/0157236 A1 | * | 10/2002 | Futamura et al. | ............ 29/564.7 |
| 2005/0257361 A1 | * | 11/2005 | Ramnauth et al. | .............. 29/430 |

OTHER PUBLICATIONS

Brochure entitled "Peddinghaus Corporation Anglemaster," Code "BK -5-06/05" listed on back page.
Brochure entitled "Peddinghaus Corporation Angelmaster," Code "BK -May 06, 2005" listed on back page.
Brochure entitled "ocean avenger cnc beam drill line" (No date listed).

* cited by examiner

*Primary Examiner*—Dana Ross
(74) *Attorney, Agent, or Firm*—Wood, Phillips, Katz, Clark & Mortimer

(57) ABSTRACT

A machine is provided for making holes in the legs of a structural angle oriented lengthwise along the X-axis of a mutually orthogonal X, Y, and Z-axis coordinate system. The machine includes a first or main frame, a second frame moveable along the Y-axis relative to the first frame, and a carriage moveable along the Z-axis relative to the second frame. A punch is mounted on the second frame for punching a first hole in the first leg of the angle. A drill is mounted on the carriage for drilling a second hole in the second leg of the angle. The punch has a punch operating axis along which the punch moves longitudinally to punch the first hole and which is parallel to the Z-axis. The drill has a drill feed operation axis along which the drill moves longitudinally to drill the second hole and which is parallel to the Y-axis. The drill and the punch are oriented with the drill feed operation axis and the punch operation axis together defining a common plane.

12 Claims, 39 Drawing Sheets

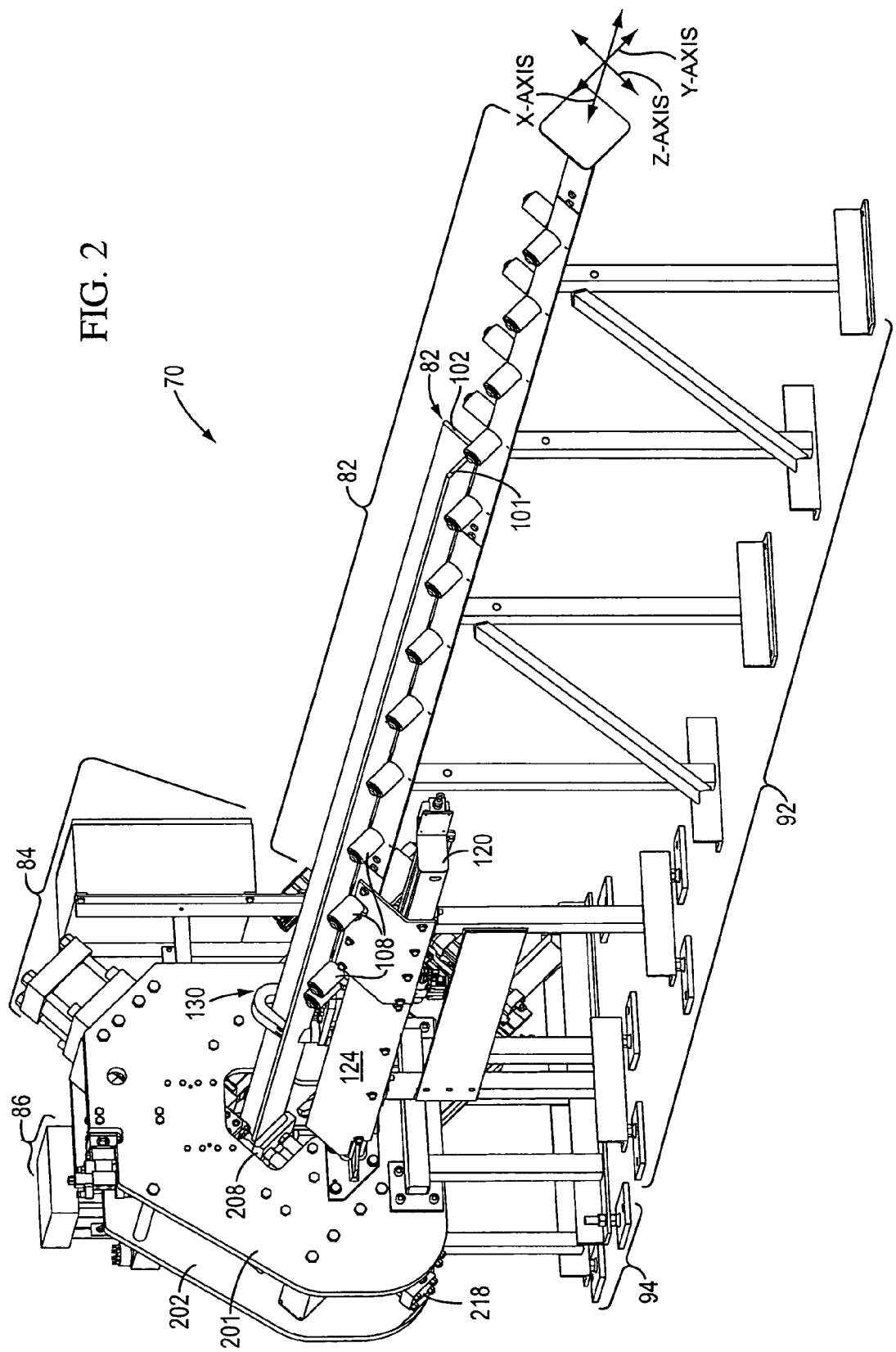

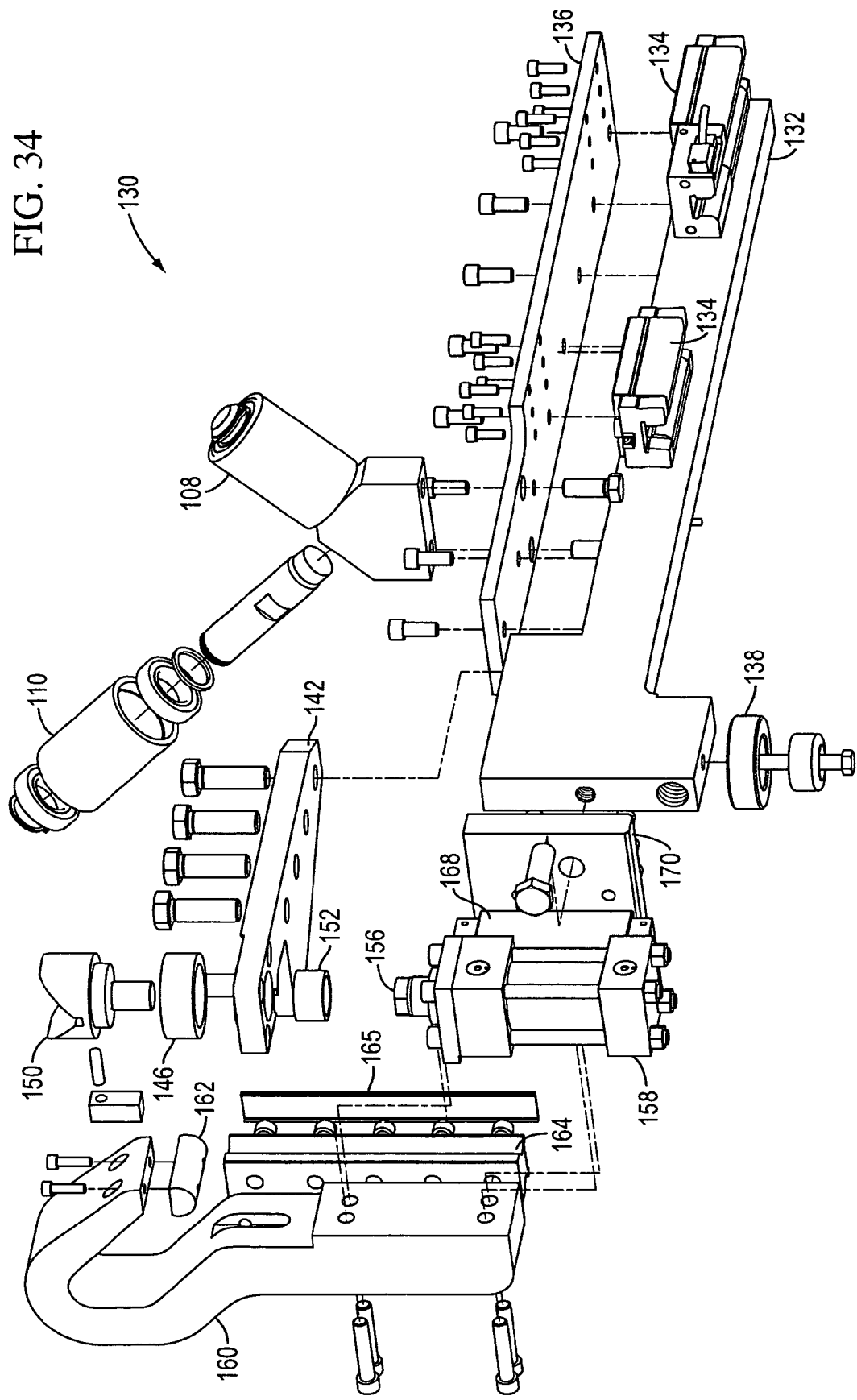

PUNCH AND DRILL MACHINE FOR A STRUCTURAL ANGLE

TECHNICAL FIELD

This invention relates to a system for punching and drilling holes in a structural angle.

BACKGROUND OF THE INVENTION AND TECHNICAL PROBLEMS POSED BY THE PRIOR ART

Preparation of a structural angle for further use may require drilling, punching, and severing portions of the angle to create a configuration needed for the particular end use application (e.g., installation in a structural steel frame of a building or bridge, installation in a vehicle, installation on or in a machine or other assembly, etc.). Conventional machines exist for performing some or a number of these processing operations.

Structural angles may have to be provided in appropriate lengths for being erected in specific structures or used in other applications. Methods for creating one or more shorter segments from a length of angle stock include severing the shorter segments from a longer length of angle stock with a shearing apparatus. See, for example, the shearing apparatus described in U.S. Pat. No. 5,394,782.

When structural angles are used in a structural steel frame for a building, the angles are typically connected with bolts to other structural frame members (e.g., I-beams or wide flange beams). The bolts are received in holes provided in the legs of the angles and in the other structural members to which the angles are connected.

Conventional methods for providing the bolt holes in an angle include drilling the holes with one or more drill spindles, or punching the holes with one or more punch presses. For example, in one type of machine, a structural angle is supported lengthwise adjacent a drill carriage which supports a drill spindle so that a drill mounted thereto can be moved to desired locations along the length of the angle, along the heights of the angle legs, and toward or away from the angle.

Holes in the legs of an angle may also be made with punch presses. Such punch presses may have conventional designs well-known to those skilled in the art. Various punch press designs for structural members are disclosed in U.S. Pat. Nos. 4,631,996, 3,722,337, and 3,720,125. A machine for processing a structural angle might also move the angle through an assembly of tools (e.g., drills, punch presses, and a shear) which are at fixed locations along the length of the machine.

For some uses of structural angles, it is desirable to be able to efficiently provide holes in the legs of relatively short lengths of structural angles. One such type of short, structural angle is a standard "clip" angle or clip used to connect two larger structural beams (e.g., I-beams or wide flange beams). FIG. 1 shows two horizontally oriented I-beams 51 and 52 connected to a vertical I-beam 53 with such clip angles 56 and 58. FIG. 1A shows the clip angle 56 alone, prior to installation. The clip angle 56 has three bolt holes 57 in each leg of the clip angle.

In the connection illustrated in FIG. 1, the I-beam 53 includes a central web 60 and two parallel flanges 62 which are each perpendicular to the web 60. The I-beam 51 has a central web 64 which is connected at one end with the clip angle 56 to the web 60 of the I-beam 53. The I-beam 52 has a central web 66 which is connected at one end with the clip angle 58 to one of the flanges 62 of the I-beam 53. The clip angles 56 and 58 are attached to the I-beams with bolts 68 and nuts 69. The bolts 68 are received in the holes in the clip angles 56 and 58 and holes made in the I-beams.

Clip angles, such as the clip angles 56 and 58, are typically between about 5 and 15 inches in length and usually have 3 or more holes in each leg. The two legs typically define a right angle (i.e., 90 degree angle) configuration extending from the structural angle vertex or heel 59 (FIG. 1A). Each hole in one leg of a clip angle is typically "in line" with a corresponding hole in the other leg. That is, the longitudinal axis of the center of a round hole in one leg is perpendicular to, but co-planar with, the longitudinal axis of the center of a corresponding round hole in the other leg.

It would be beneficial to provide an improved machine that could efficiently make holes in the legs of structural angles, especially clip angles.

It would also be advantageous to provide an improved machine that could efficiently make holes in a structural angle, especially a clip angle, at or near the lateral side edge of the angle and at or near the longitudinal end edge of the angle.

Further, it would be desirable if such an improved machine for making holes in structural angles had a relatively short length and also had an improved design that could accommodate carriage feeding of a stock length of structural angle with reduced length requirements for the carriage travel.

It would also be beneficial to provide such an improved machine with the capability to very rapidly move the machine components into position adjacent the desired location of a hole to be made in the structural angle, and to move the machine components in a way that minimizes the amount of time required to move the machine components into the positions or locations for making the holes.

Also, it would be advantageous to provide such an improved machine with the capability for reducing the amount of motion required to position the machine components as necessary to make a hole, thus reducing the possibility for positioning errors.

It would also be desirable to provide an improved machine employing both a drill and a punch. This would allow the punch to be advantageously used instead of the drill to create some holes either more quickly and/or with non-circular configurations, but would allow the drill to be used in situations where there is not enough clearance near the angle vertex (i.e., heel) to accommodate a punch or where the hole can be made better by drilling (e.g., when the angle leg thickness is greater than the hole diameter).

It would also be desirable if such an improved machine could (1) be designed to be readily operated manually or by an appropriate automatic or semi-automatic control system, (2) accommodate a variety of different sizes of structural angles, and (3) produce accurate and repeatable results.

Further, it would be advantageous if the improved machine could be manufactured, installed, and operated without incurring excessive costs or expenses.

SUMMARY OF THE INVENTION

The present invention provides a novel, improved system that can make holes in the legs of a structural angle and that can accommodate designs having some or all of the above-discussed benefits and features.

According to one aspect of the invention, the system can be employed in a machine for creating holes in the first and second legs of a structural angle oriented lengthwise along the X-axis of a mutually orthogonal X, Y, and Z-axis coordinate system. The machine includes (1) a first frame, (2) a movable, second frame mounted to the first frame for movement along the Y-axis relative to the first frame, and (3) a movable carriage mounted on the second frame for movement along the Z-axis relative to the first frame.

A punch is mounted on the second frame for punching a first hole in the first leg of the angle.

A drill is mounted on the carriage for drilling a second hole in the second leg of the angle.

The punch has a punch operation axis along which the punch moves longitudinally to punch the first hole and which is parallel to the Z-axis.

The drill has a drill feed operation axis along which the drill moves longitudinally to drill the second hole and which is parallel to the Y-axis.

The drill and the punch are oriented with the drill feed operation axis and the punch operation axis together defining a common plane.

In the preferred form of the invention, it is possible to efficiently make a first hole in a first leg of a structural angle, and then make a second hole in the second leg of the structural angle where the first and second holes are "in line" such that the longitudinal axis of the center of the first hole lies in the same plane as the longitudinal axis of the center of the second hole. The two holes can be made without changing the position of the machine components or structural angle relative to the length of the structural angle along the X-axis. Specifically, the first hole can be made with the punch, and then the second hold can be made with the drill without moving the machine components or the structural angle along the X-axis. This makes the process efficient, and this can improve accuracy by eliminating the potential for error associated with additional machine movement.

Because the first hole in the first leg of the structural angle can be made by the punch, and because the second hole in the second leg of the structural angle can be made by the drill, it is not necessary to provide two separate punches. The use of only one punch instead of two or more punches permits the overall size or length of the machine to be reduced. The reduction results from elimination of a second punch that would otherwise have to be located in side-by-side relationship to the first punch. Further, if a carriage device is used to feed the stock length of angle in the X-axis direction for punching and then through an exit shear, the length of the carriage can be reduced and the length of the carriage movement can be reduced, because the carriage arm does not need to travel into a second punch to position the angle for shearing at a shear located at the exit of such a second punch.

Because the drill is on the carriage mounted on the second frame which moves the operation axis of the punch along, but perpendicular to, the Y-axis, a preferred form of the invention can employ an accurate positioning feedback system for positioning the punch at the desired Y-axis location along the first leg of the structural angle and also for positioning the distal end of the drill along the Y-axis relative to the second leg of the structural angle. This permits the drill to first be rapidly moved lengthwise along the Y-axis to locate the drill tip near the surface of the second leg of the structural angle, and then be moved slowly at a desired drill feed rate for actually drilling the hole in the angle second leg. The invention also accommodates, where desired, accurate position feedback to control the drill depth.

Because the machine includes a drill and a punch, the holes made by the punch can be made relatively quickly compared to drilling, and the holes made by the punch can have non-circular configurations, such as oval or slotted.

The punch has another advantage in that the cost of punch tooling per hole is typically less than the cost of drill tooling per hole. Thus, the capability to produce at least some of the holes with a punch can help reduce or minimize the manufacturing cost. However, in some situations, a punch cannot be used to punch a hole in the leg of a structural angle. For example, if a hole is to be made in the second leg of the angle very close to the opposing first leg of the angle, then a punch cannot punch such a hole because of punch mechanism interference with the opposing leg. In such a case, the present invention permits a hole in the second leg to instead be drilled with the drill. Also, if desired, one or more of the holes in the first leg could be drilled rather than punched, by re-positioning the angle in the machine as might be necessary to locate the first leg against the drill.

Further, the drill can be advantageously used to make holes that are smaller in diameter than the thickness of the material—a capability that is difficult or impossible to provide with a conventional punch, depending upon the type of material, thickness, hole size, etc. Further, in certain applications or jobs wherein it is desired not to use a punch, all of the holes in the angle can be made solely with at least one drill if the structural angle is suitably positioned (and/or re-positioned) as necessary to locate first one leg, and then the other leg, adjacent the drill or drills.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 2 is an isometric view of a structural angle processing system comprising (1) an angle gripping and advancing module or machine, (2) the combined angle punch press and drill module or machine of the present invention, and (3) an angle shear module;

FIG. 7 shows the angle punch press and drill machine or module of the present invention along with the angle shear machine or module, but FIG. 7 omits the angle gripping and advancing machine or module, and FIG. 7 omits the structural angle;

FIG. 8 shows the angle punch press and drill machine or module of the present invention along with the angle shear machine or module, but FIG. 8 omits the angle gripping and advancing machine or module, and FIG. 8 omits the structural angle;

FIG. 9 shows the combined angle punch press and drill machine or module of the present invention along with the angle shear machine or module, but FIG. 9 omits the angle gripping and advancing machine or module, and FIG. 9 omits the structural angle;

FIG. 18 shows the structural angle in position within the machine, and FIG. 18 shows the punch press C-frame ("second" frame) moved relative to the main ("first" frame) to the fully extended position along the Y-axis, and shows the drill carriage at the fully extended position along the Z-axis;

FIG. 21 shows the punch extended into the first leg of the structural angle;

FIG. 34 is an exploded, front, isometric view of the angle gripper subassembly.

DESCRIPTION OF THE PREFERRED EMBODIMENT

Figure 1:
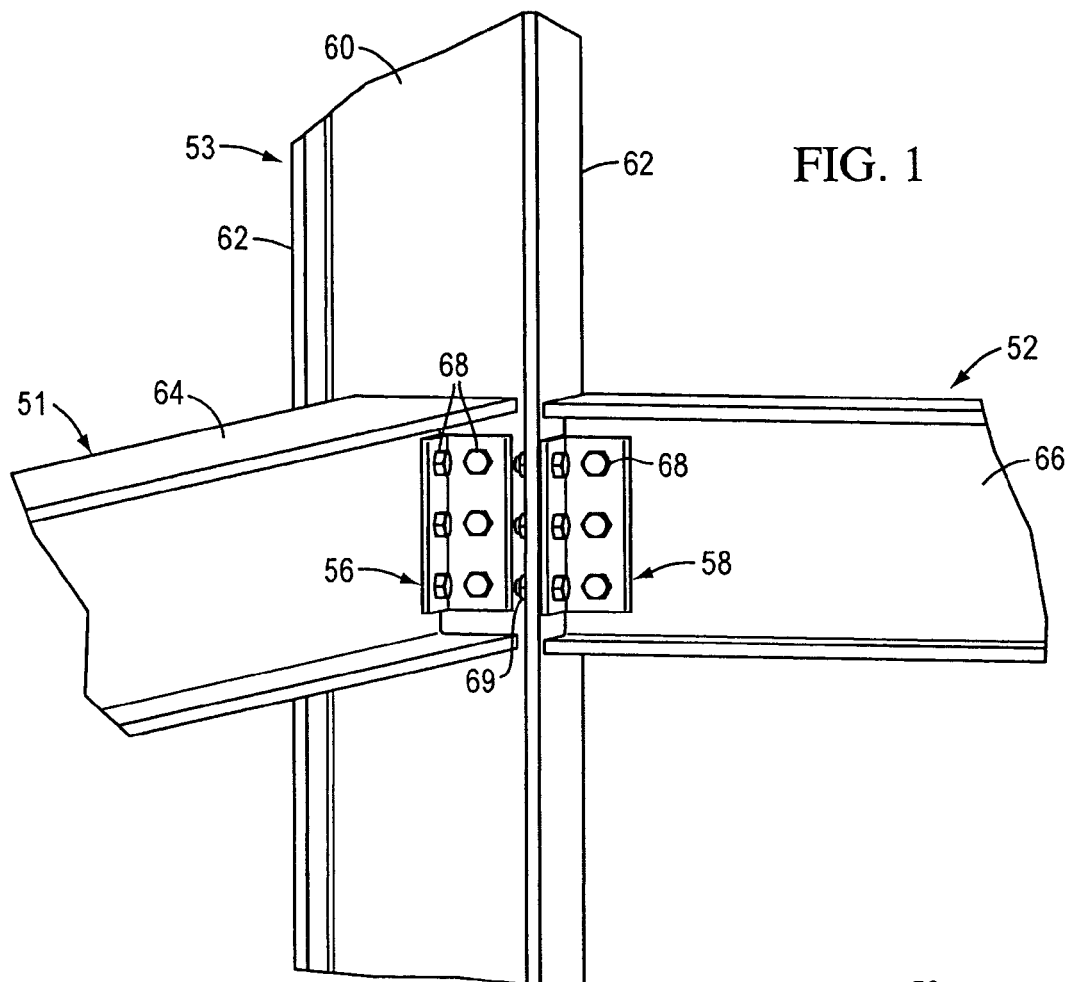
FIG. 1 is a fragmentary, isometric view of a structural steel framework consisting of a vertical I-beam connected to two horizontal I-beams with clip angles or "clips" fastened with bolts and nuts.
Figure 1A:
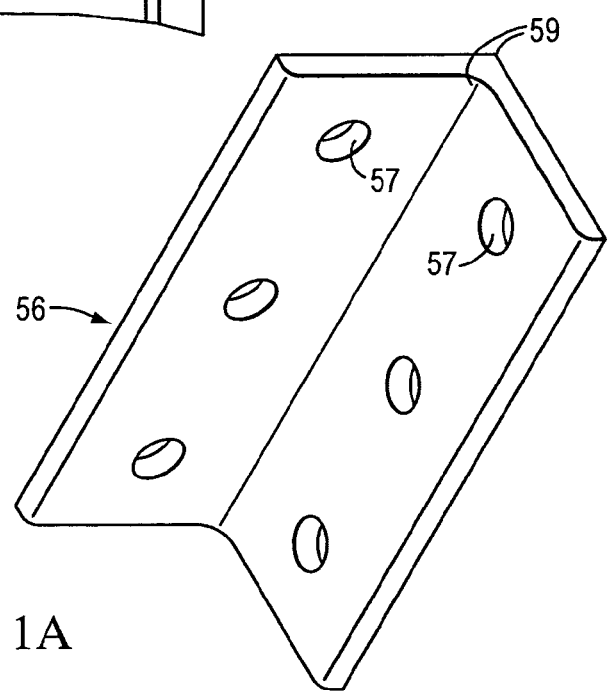
FIG. 1A is an isometric view of one of the clips shown in FIG. 1 before installation of the clip in the framework.

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus operating in accordance with this invention is described in the normal (upright) operating position, and terms such as upper, lower, horizontal, etc., are used with reference to this position.

The apparatus of this invention can have certain conventional components and control mechanisms the details of which, although not fully illustrated or described, will be apparent to those having skill in the art and an understanding of the necessary functions of such components and mechanisms.

Some of the Figures illustrating the preferred embodiment of the apparatus of the present invention show conventional structural details and mechanical elements or components that will be recognized by one skilled in the art. However, the detailed descriptions of such elements are not necessary to an understanding of the invention, and accordingly, are herein presented only to the degree necessary to facilitate an understanding of the novel features of the present invention. For example, in some of the figures, such as FIGS. 6B, 11, 13, 14, 16, 19, 21, 22, and 23, the cross sections of various hydraulic piston/cylinder actuators are shown in a simplified manner that omits configurations of the conventional designs of the internal pistons, seals, etc. Also, in some of the figures, such as FIGS. 6A, 9, 10, 16, 18, 19, and 22, for example, the cross sections of the hydraulic drill motor are shown in a simplified manner that omits internal configurations of the conventional designs of the internal parts of the drill motor. Also, in some of the figures, such as FIGS. 6B, 27, 28, 29, 34, and 35, for example, the threads on the bolts and machine screws have been omitted for ease of illustration.

FIG. 2 shows a processing system 70 for processing a stock length of a structural angle, such as a structural steel angle 80, and the system incorporates the module or machine of the present invention for making holes in the angle 80. For ease of illustration, some of the conventional system components (e.g., hydraulic lines, electrical power conduit, etc.) have been omitted. The system includes a processing path along which a length of angle stock, such as the structural steel angle 80, can be moved and positioned.

The system 70 can make holes in one or both legs of the angle 80, and then cut off a shorter piece as an angle clip, such as one of the clips 56 and 58 discussed above in the section entitled "BACKGROUND OF THE INVENTION AND TECHNICAL PROBLEMS POSED BY THE PRIOR ART." The processing system 70 may be regarded as a single, processing system, line, or combination machine which includes three individual modules, assemblies, or machines: (1) an angle gripping and advancing module 82, (2) a combination angle punch press and drill module or machine 84, and (3) an angle shear module 86. In the preferred arrangement illustrated, the three modules are bolted together and can be operated together as a system. The combination angle punch press and drill module or machine 84 incorporates the present invention, and is referred to hereinafter in the specification and claims as a "machine" for creating holes in the structural angle 80.

The angle gripping and advancing module 82 and the angle shear module 86 may be regarded as modules, assemblies, or machines which can be used in other applications as well as with the combination angle punch press and drill module 84 of the present invention. The angle gripping and advancing module 82 and the angle shear module 86 may be of any suitable conventional or special design, the details of which form no part of the present invention. Indeed, a broad aspect of the present invention does not require that the combination angle punch press and drill machine 84 be used with either the angle gripping and advancing module 82 or the shear module 86.

Figure 5:
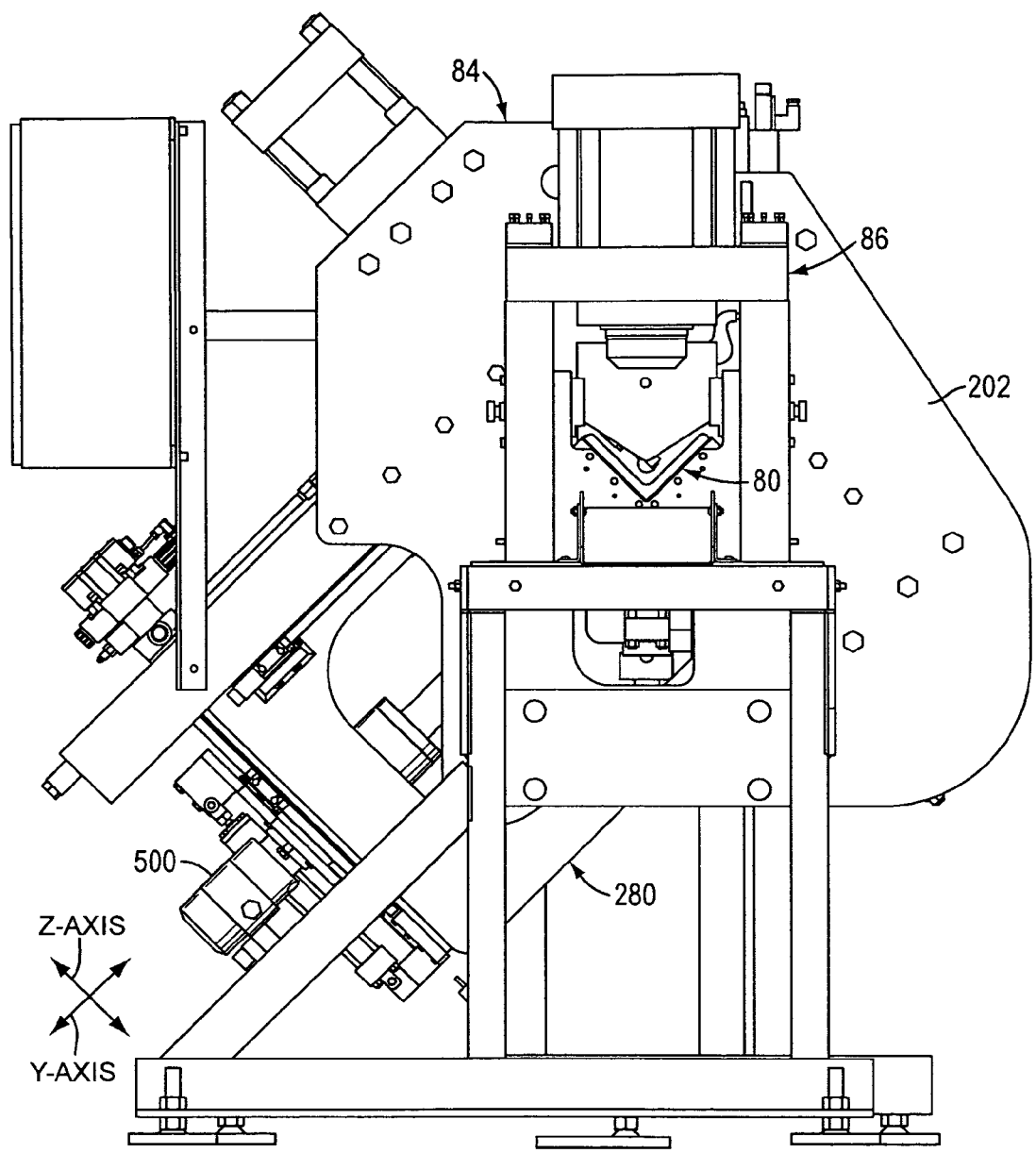
FIG. 5 is an end view of the processing system taken along the plane 5-5 in FIG. 3.

The combination angle punch press and drill module 84 is adapted to receive and process the stock length of angle 80, or even a much shorter, already cut-to-length section of angle. The machine 84 is adapted to receive the length of angle 80 (or other shorter or longer piece of a structural angle) in a particular orientation that may be arbitrarily described as extending along an X-axis (FIGS. 2 and 3) of a mutually orthogonal X, Y, and Z-axis coordinate system. FIG. 5 more clearly illustrates the orientation of the Y-axis and Z-axis of the coordinate system, and the Y-axis and Z-axis together define a plane perpendicular to the length of the angle 80 which is oriented lengthwise along or parallel to the X-axis (FIG. 3).

In this specification and in the claims, components are described as being moved or oriented "along" the X, Y, or Z-axis or moved to a location along or on the X, Y, or Z-axis. It is to be understood that such a movement or orientation may occur on a path that is spaced from, but parallel to, the particular designated axis that passes through the coordinate system origin. Further, some components are described as moving in the X, Y, or Z axis "direction." Such a "direction" may refer to either of the two opposite directions along the particular designated axis.

Figure 3:
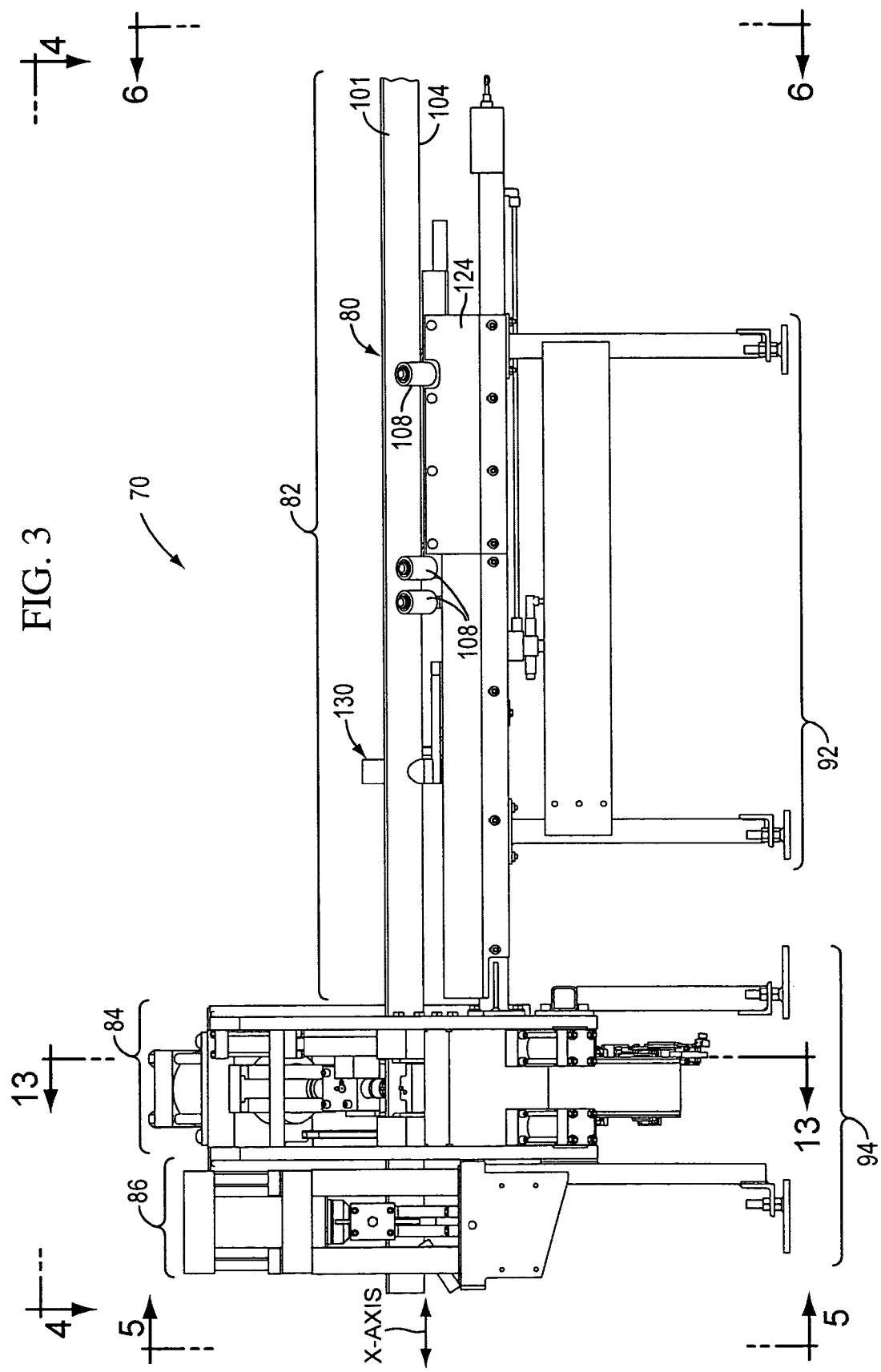
FIG. 3 is a fragmentary, front, elevational view of the processing system shown in FIG. 2.

In the preferred form of the processing system 70 illustrated in FIG. 3, the angle 80 is supported and processed at a convenient height above the floor, and to this end, the angle gripping and advancing module 82 includes a suitable support frame 92, and the combination punch press and drill machine 84 includes a support frame 94. The frames 92 and 94 may have any suitable conventional or special construction, the details of which form no part of the present invention.

Figure 4:
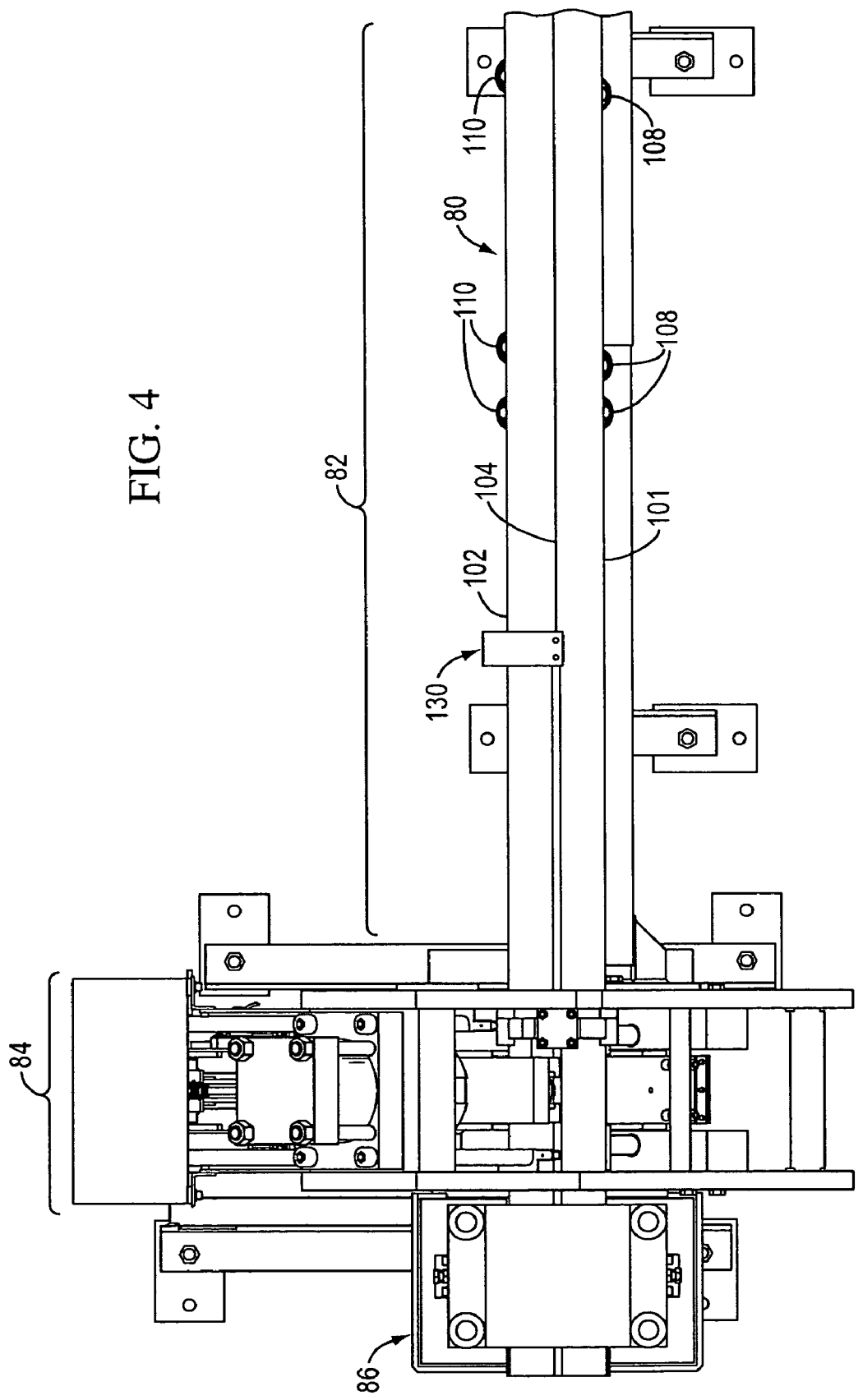
FIG. 4 is a fragmentary, top, plan view of the processing system illustrated in FIGS. 2 and 3.

As illustrated in FIG. 2, the angle 80 has a first leg 101 and a second leg 102. As shown in FIGS. 2, 3, and 4, the legs 101 and 102 diverge from a vertex or heel 104 (FIG. 4). The angle 80 is oriented so that the heel 104 projects downwardly while the legs 101 and 102 extend upwardly. For a conventional angle 80 which is typically employed in a variety of uses, the first leg 101 and second leg 102 define a right angle (i.e., the first leg 101 and second leg 102 diverge from the heel 104 to define a 90 degree included angle). The first leg 101 is supported on three rollers 108 (FIGS. 2 and 3) which are part of the angle gripping and advancing module 82, and the second leg 102 is supported on three rollers 110 (FIGS. 4 and 31) which are also part of the angle gripping and advancing module 82.

Although the angle gripping and advancing module 82 forms no part of the present invention combination angle punch press and drill machine 84, the angle gripping and advancing module 82 will next be briefly described as a device suitable for moving the angle 80 through the combination angle punch press and drill machine 84 and through the angle shear module 86. In particular, with reference to FIGS. 2 and 30, the angle gripping and advancing module 82 includes a horizontal support member 120 mounted to the top of the frame 92.

Figure 30:
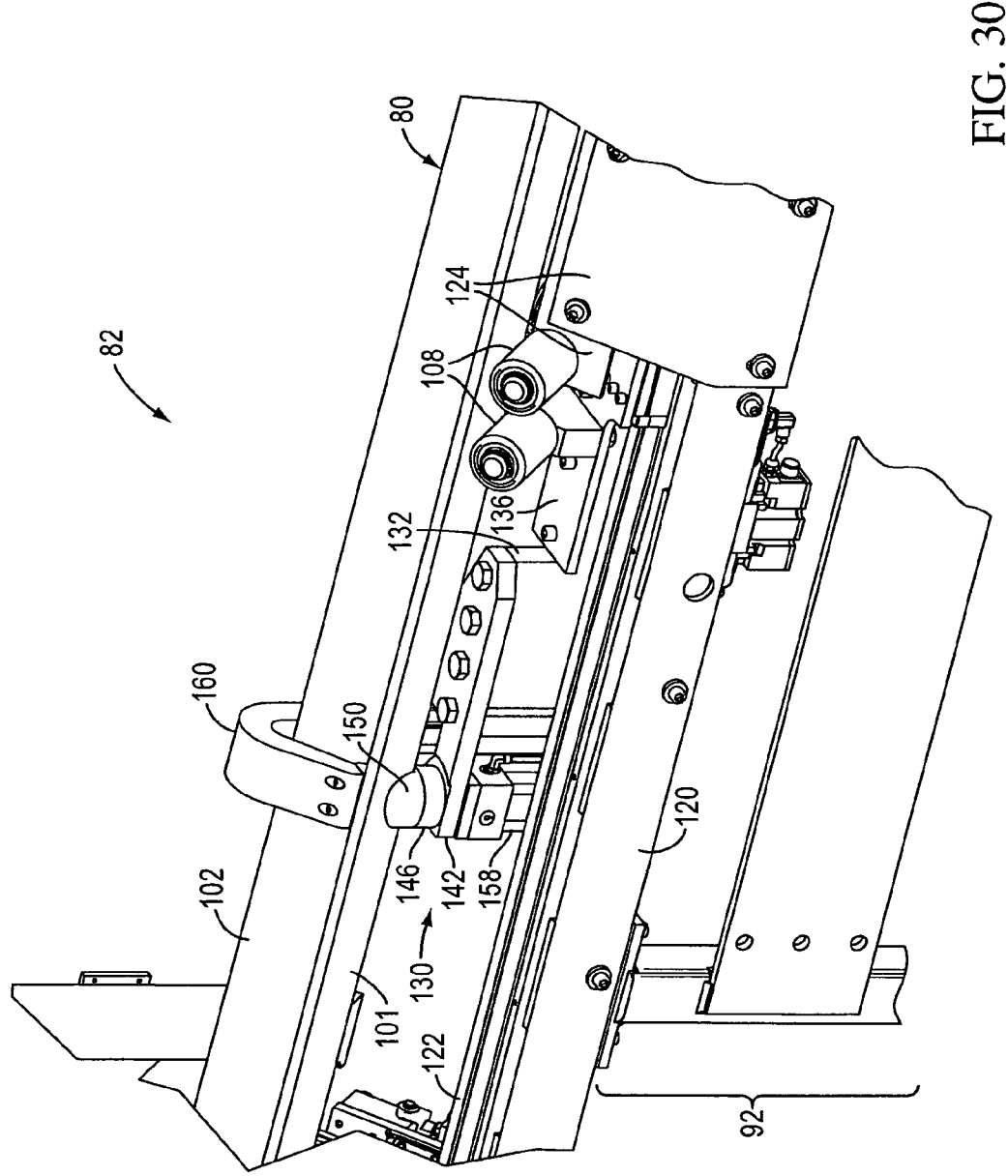
FIG. 30 is a fragmentary, front, isometric view of the angle gripping and advancing module.
Figure 31:
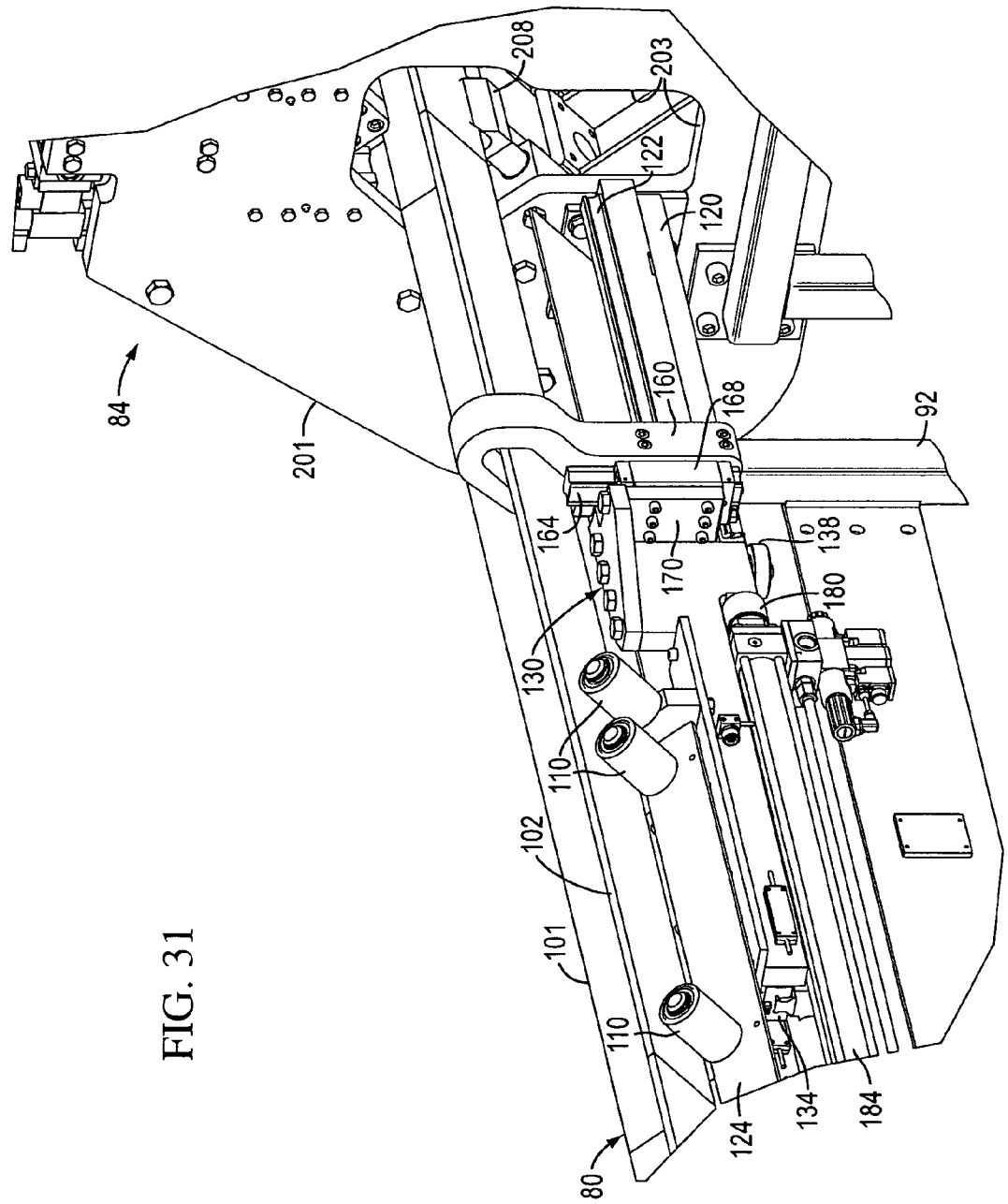
FIG. 31 is a fragmentary, rear, isometric view of the angle gripping and advancing module.

Mounted to the support member 120 is a rail 122 (FIGS. 30 and 31). As can be seen in FIG. 30, one of the angle first leg support rollers 108 is mounted to an inverted, V-shaped plate assembly 124 which in turn is mounted to the horizontal support member 120. As can be seen in FIG. 2, a second, rearward most roller 108 is also mounted to the plate assembly 124. As shown in FIGS. 31 and 36, on the other side of the angle 80, the two rearwardmost rollers 110 are also mounted to the plate assembly 124 for supporting the angle second leg 102.

Figure 35:
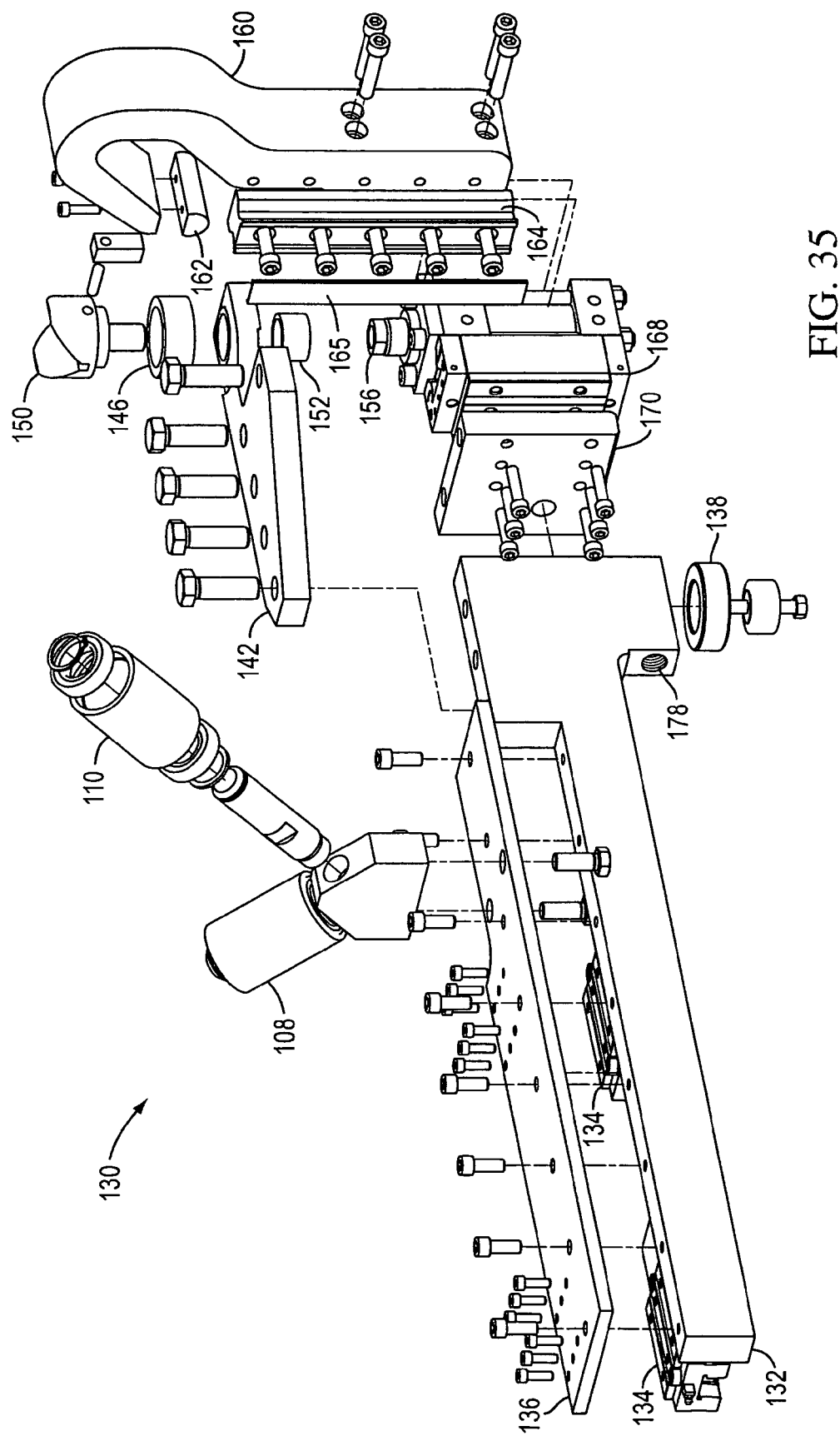
FIG. 35 is an exploded, rear, isometric view of the angle gripper subassembly.

A carriage or gripper assembly 130 (FIGS. 2 and 30-35) is mounted for reciprocating movement on the rail 122. As can be seen in FIGS. 34 and 35, the gripper assembly 130 includes a vertically oriented plate or main support 132. A pair of X-axis rail bearings 134 are bolted to a horizontal bearing plate or bracket 136 which in turn is bolted to the top of the main support 132. The X-axis rail bearings 134 are adapted to be slidably received on the main horizontal support member rail 122 as shown in FIGS. 30 and 31. Also mounted to the bearing bracket 136 is the forwardmost one of the rollers 108 and the forwardmost one of the rollers 110.

As can be seen in FIGS. 32-35, a horizontally disposed cam roller 138 is mounted to a downwardly projecting portion of the main support 132 and is adapted to roll against one side of the horizontal support frame 120 (as can be seen in FIG. 31).

Figure 32:
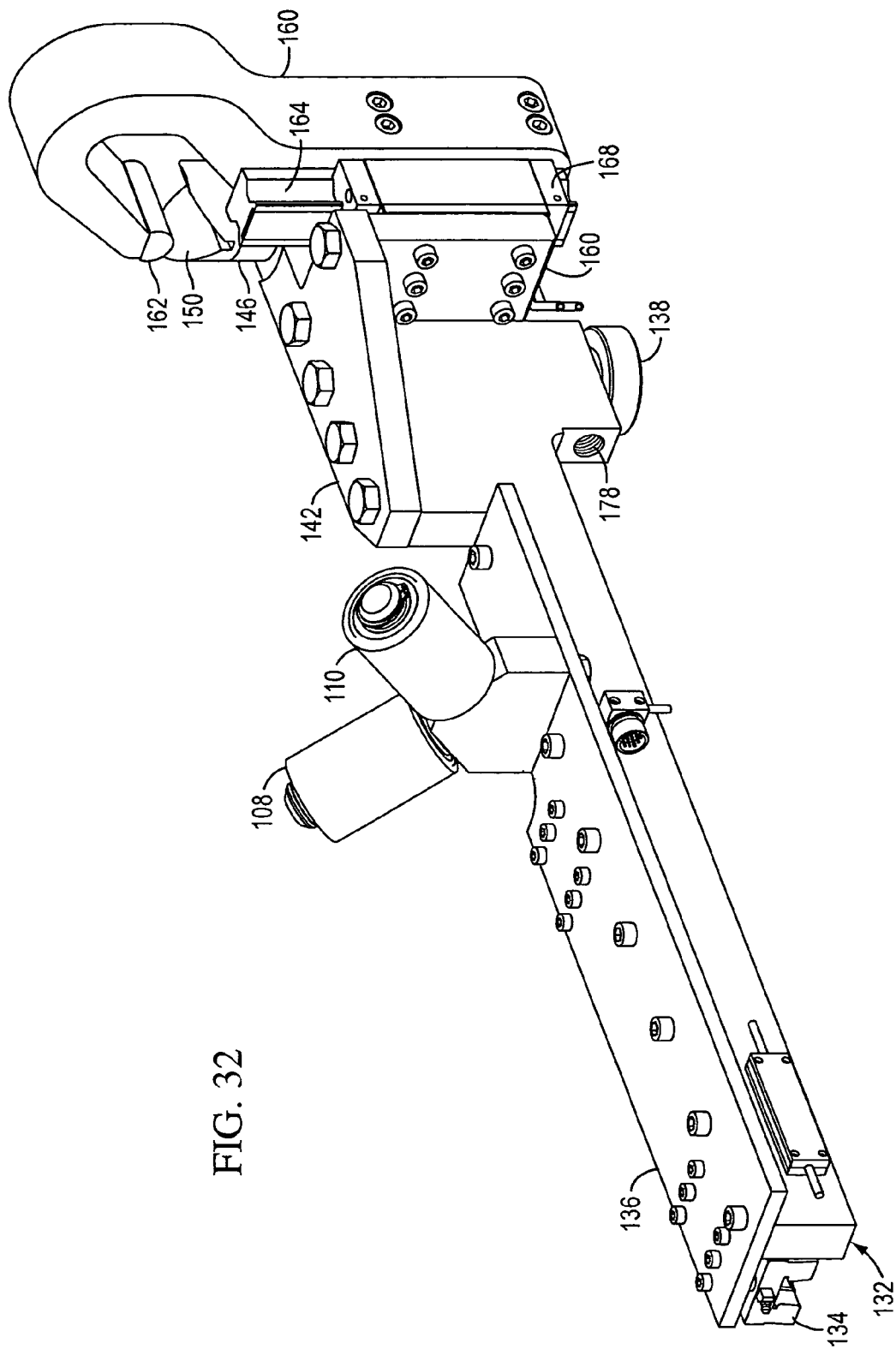
FIG. 32 is a rear, isometric view of the angle gripper sub-assembly.
Figure 32A:
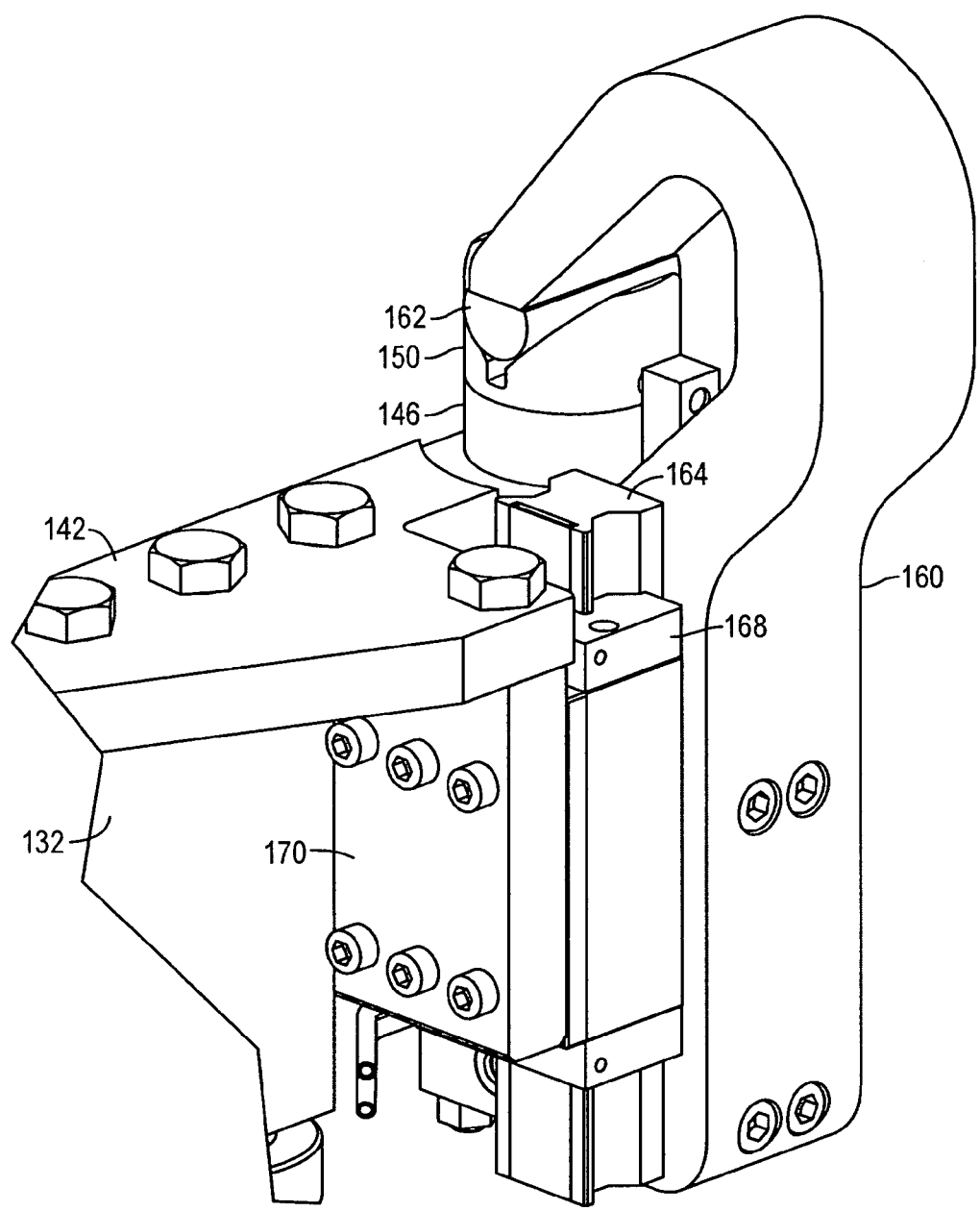
FIG. 32A is a fragmentary, rear view similar to FIG. 32, but FIG. 32A shows the piston/cylinder actuator as operated to move the vertical gripper down to position the upper gripper in its lowermost position against the lower gripper jaw.
Figure 33:
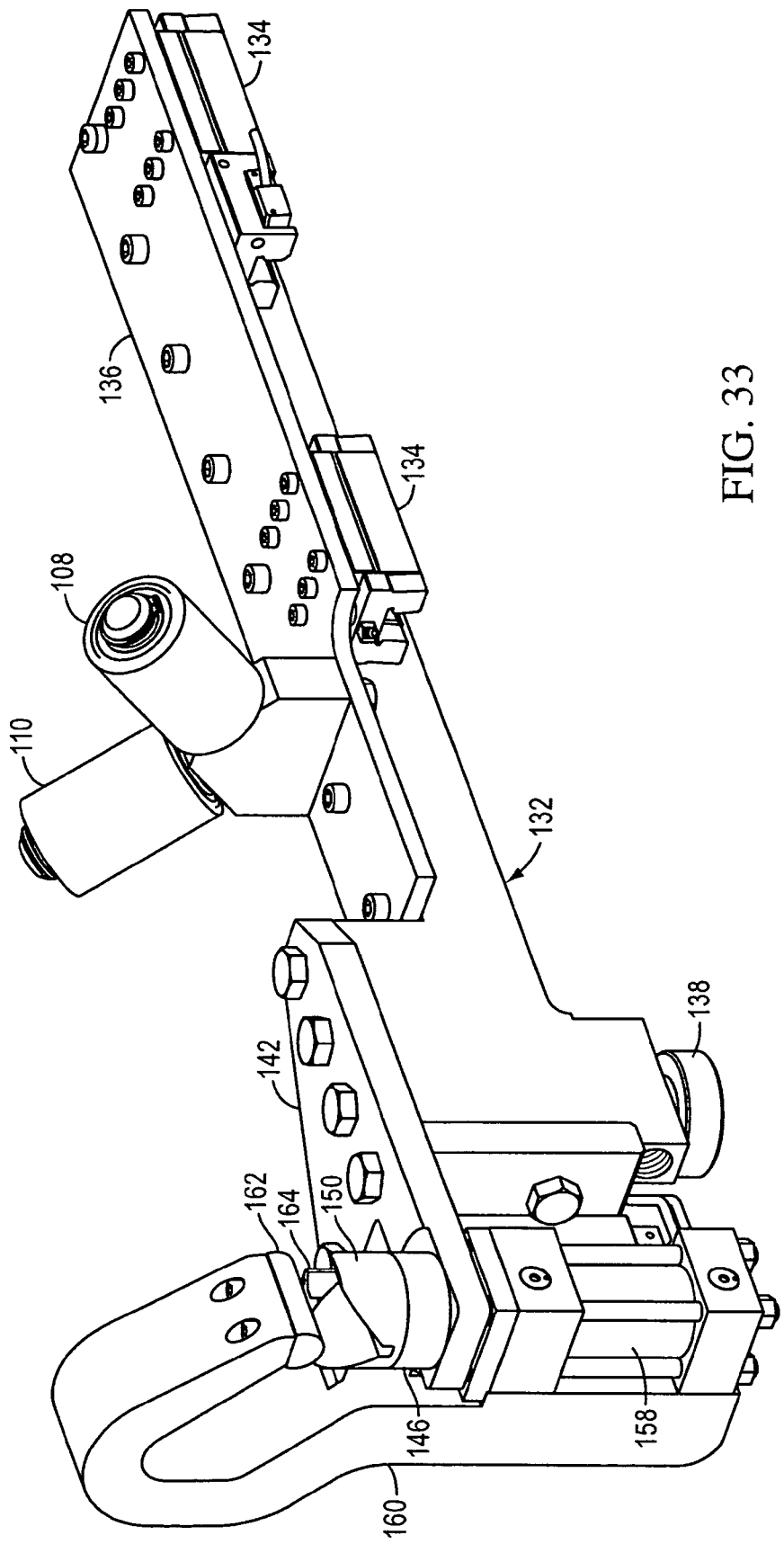
FIG. 33 is a front, isometric view of the angle gripper subassembly.
Figure 33A:
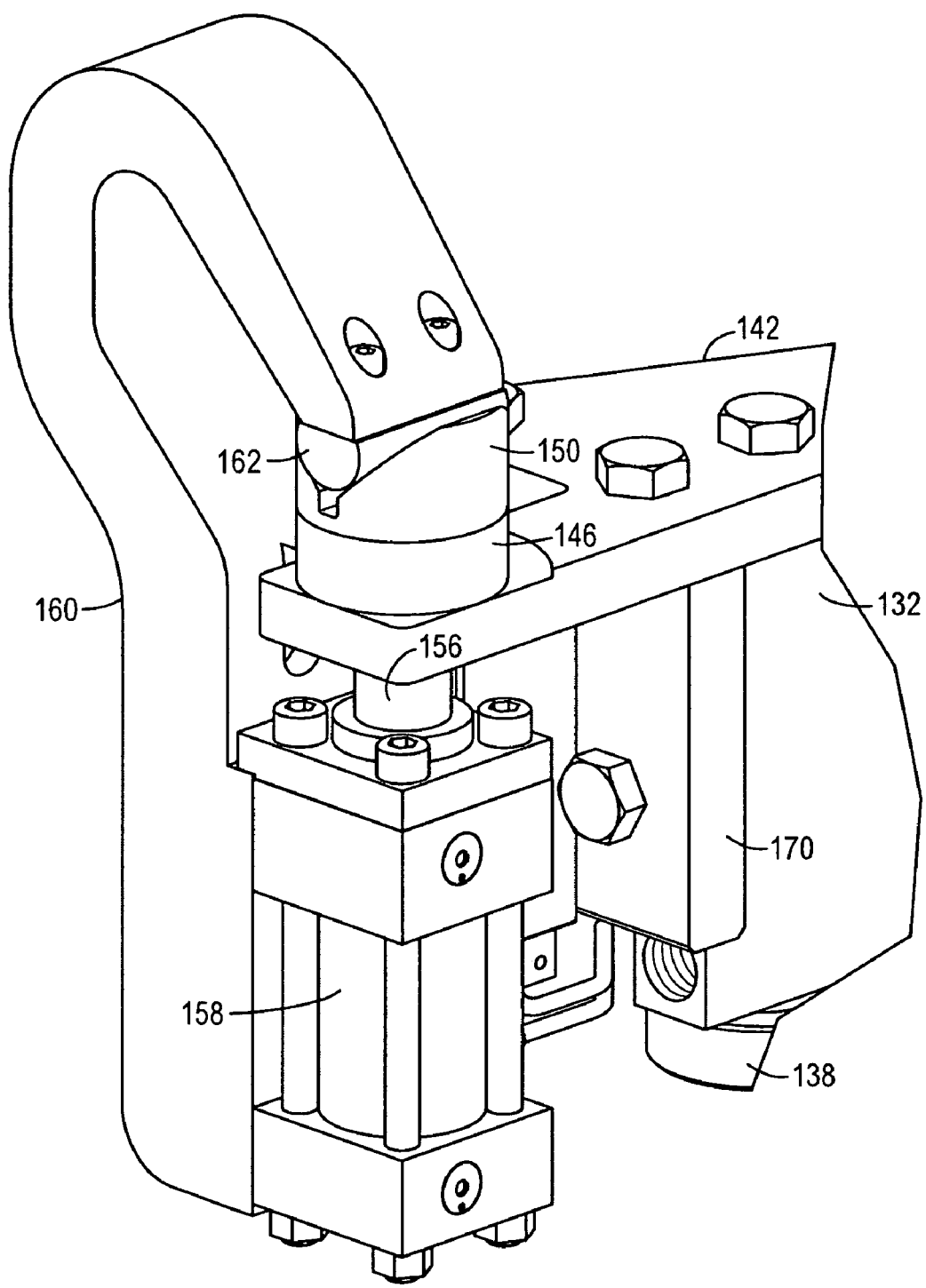
FIG. 33A is a fragmentary, front view similar to FIG. 33, but FIG. 33A shows the piston/cylinder actuator as operated to move the vertical gripper down to position the upper gripper in its lowermost position against the lower gripper jaw.

As can be seen in FIGS. 32 and 33, a support plate 142 is mounted to the top of an upwardly projecting portion of the front end of the main support 132. As can be seen in FIGS. 32 and 33, the support plate 142 carries an annular polyurethane spring 146 and a lower gripper jaw 150 which is seated on the spring 146. As can be seen in FIGS. 34 and 35, the lower gripper jaw 150 includes a downwardly extending threaded end portion 148 projecting through a bore in the support plate 142 and into a bushing 152 that is press fit into the bore in the plate 142 (as can be seen in FIGS. 34 and 35). The bushing 152 receives the top end of the piston rod 156 of a hydraulic piston/cylinder actuator 158 as shown in FIGS. 34 and 35. The top end of the piston rod 156 has an annular configuration with an internal female thread for being threadingly connected to the lower threaded end portion 148 of the lower gripper 150. As can be seen in FIG. 33A, the actuator 158 can be operated to move the cylinder portion of the actuator 158 downwardly along the piston 156 below the support plate 142.

As can be seen in FIGS. 30 and 31, the actuator 158 is bolted to a vertical gripper 160 which has an upper jaw 162 adapted to engage the inside of the heel of the angle 80 when the vertical gripper jaw 160 is positioned to engage the angle 80 resting on the lower gripper jaw 150.

Mounted to one side of the vertical gripper 160 is a vertical rail 164. The vertical rail 164 (FIGS. 34 and 35) is bolted to one side of the vertical gripper 160, and the bolt heads are covered with a protective insert strip or plate 165. The rail 164 is slidably disposed in a stationary, vertical bearing 168 (FIGS. 32 and 35) which is bolted to a vertical bearing plate 170 which in turn is bolted to the underside of the support plate 142 and also to the end of the main support 132. One side of the piston of the actuator 158 can be pressurized to raise the actuator cylinder upwardly on the piston to the fully retracted condition of the actuator 158. This carries the vertical gripper 160 to the fully raised position wherein the upper jaw 162 is fully elevated and cannot engage the structural angle (i.e., angle 80 in FIGS. 2, 30, and 31). The weight of the assembly holds the lower jaw 150 down against the spring 146, and that provides clearance above the lower jaw 150 for the X-axis advancement or retraction of the structural angle 80 above the lower jaw 150.

Actuation of the piston/cylinder actuator 158 to extend the cylinder downwardly along the piston 156 moves the vertical gripper 160 downwardly so that the upper gripper 162 clamps the angle 80 against the lower jaw 150 as can be seen in FIG. 30.

As can be seen in FIG. 32, the main support 132 includes a threaded aperture 178, and, as shown in FIG. 31, the end 180 of a piston rod is threadingly engaged in the aperture 178, and the piston rod is connected at the other end to a hydraulic piston/cylinder actuator 184. The cylinder of the piston/cylinder actuator 184 is mounted to the horizontal support member 120 (FIG. 31). Actuation of the piston/cylinder actuator 184 to extend the piston will move the gripper assembly 130 in the X-axis direction toward the combination punch press and drill machine 84 so as to move a leading portion of the gripped angle 80 into the machine 84. Retraction of the piston in the actuator 184 will move the gripper assembly 130 rearwardly away from the machine 84.

The vertical gripper 160 can be actuated to clamp the angle 80 when the gripper assembly 130 is moved rearwardly so as to retract the leading portion of the angle 80 away from the shear module 86. In another mode of operation, the vertical gripper 160 can be released so that the gripper assembly 130 can be retracted further rearwardly to allow re-gripping of the angle 80 closer toward the trailing end of the angle 80 prior to subsequently advancing the angle 80 further into the combination punch press and drill machine 84 and toward the shear module 86.

The above-described actuators 158 and 184 may be of any suitable conventional or special design. In the presently preferred arrangement of the angle gripping and advancing module 82, each actuator 158 and 184 is a hydraulic actuator sold in the U.S.A. under the designation CDT4 series actuators by Bosch-Rexroth having an office at 5150 Prairie Stone Parkway, Hoffman Estates 60192-3707, U.S.A.

The above-described detailed design and structure of the entire angle gripping and advancing module 82 forms no part of the combination punch press and drill machine 84 invention per se. Indeed, the combination punch press and drill machine 84 invention may be practiced without any automatic angle gripping and advancing module 82 if the angle is manually moved into, through, and out of the combination punch press and drill machine 84 of the present invention. However, of course, the processing of a structural angle is more efficient and less labor intensive if some sort of angle gripping and advancing mechanism, such as the module 82, is employed to feed the angle through the combination punch press and drill machine 84.

Figure 6:
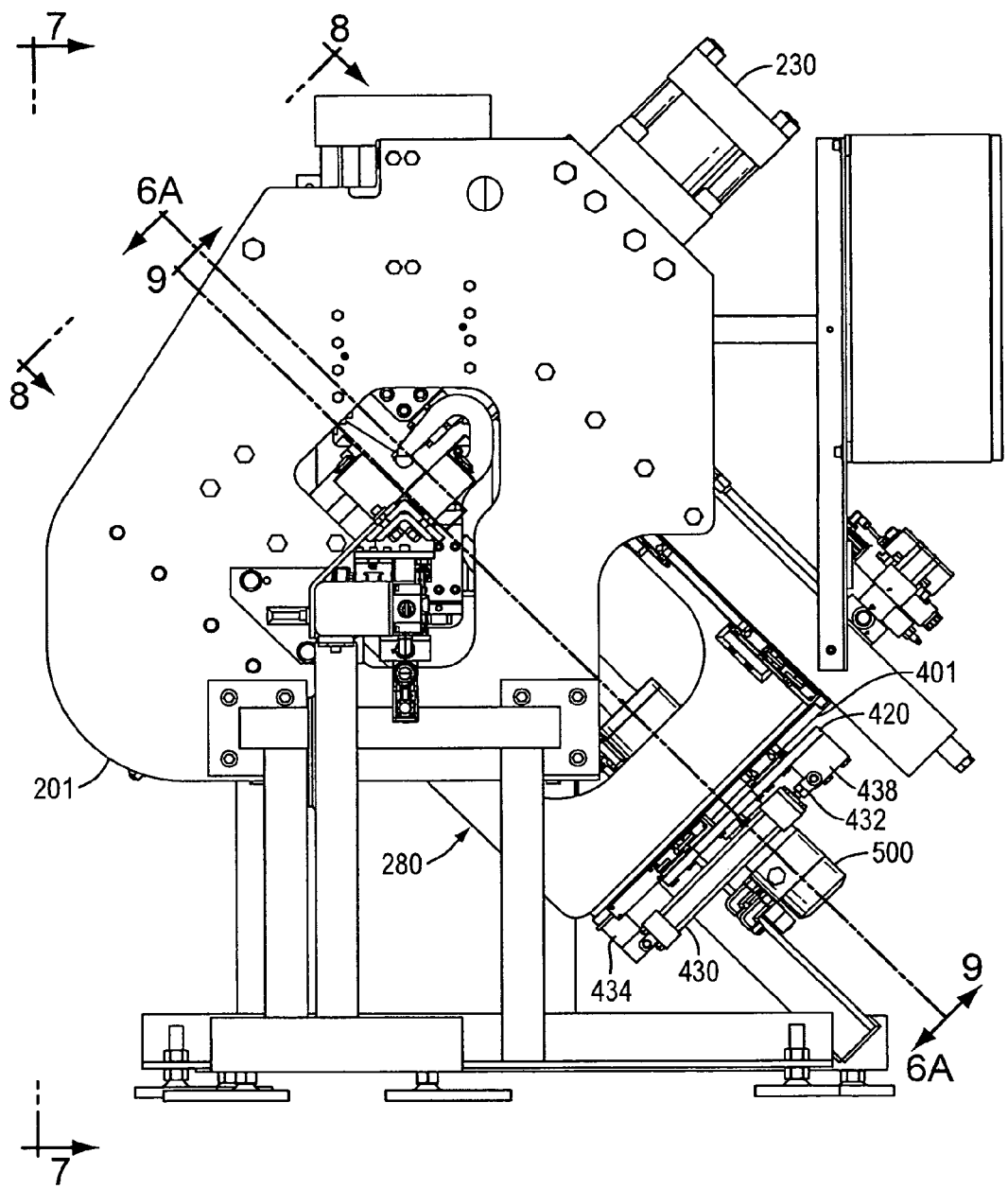
FIG. 6 is an end view of the processing system taken along the plane 6-6 in FIG. 3, and the structural angle has been omitted from FIG. 6 to better illustrate interior detail.
Figure 6A:
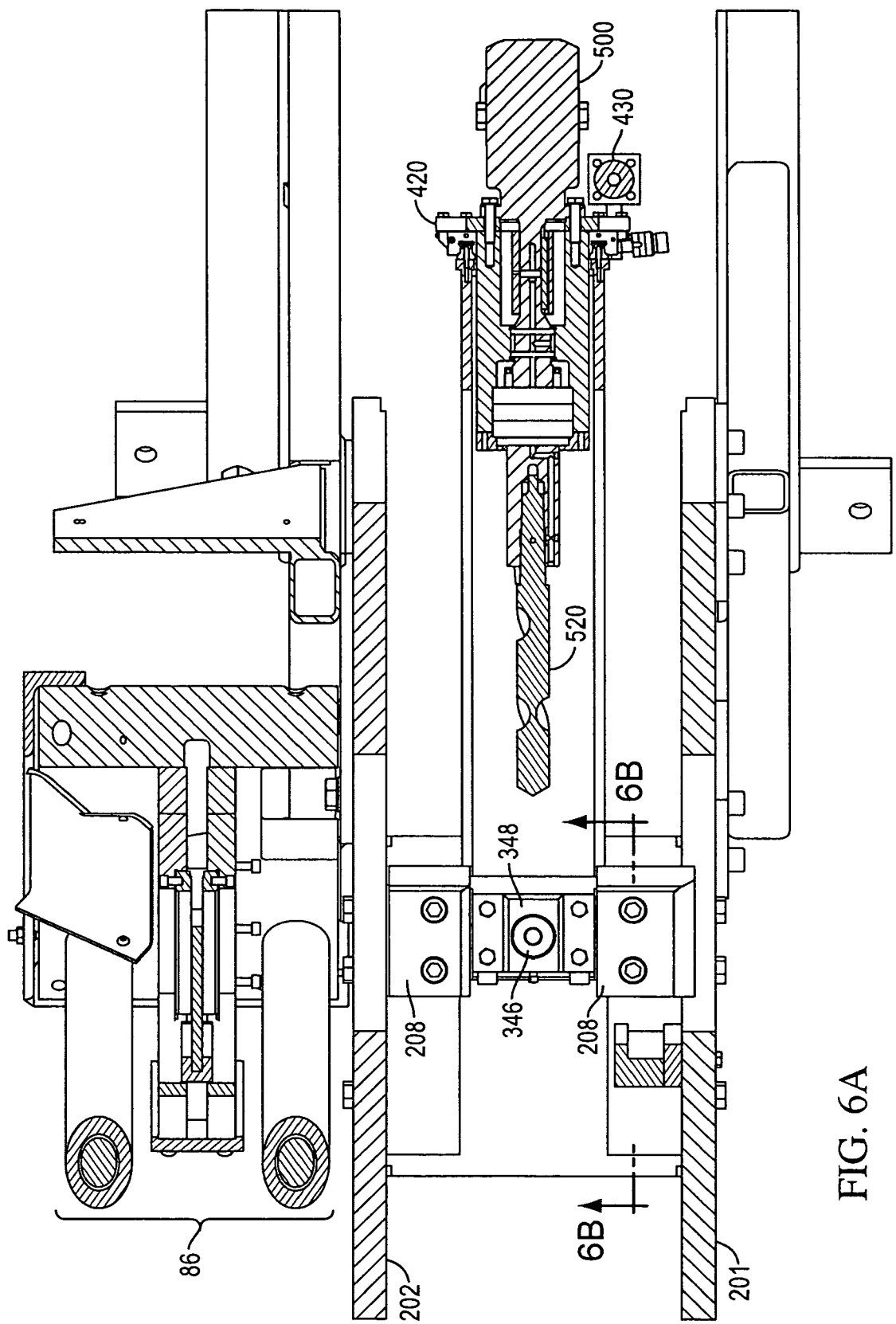
FIG. 6A is a cross-sectional view taken generally along the broken plane 6A-6A in FIG. 6.
Figure 6B:
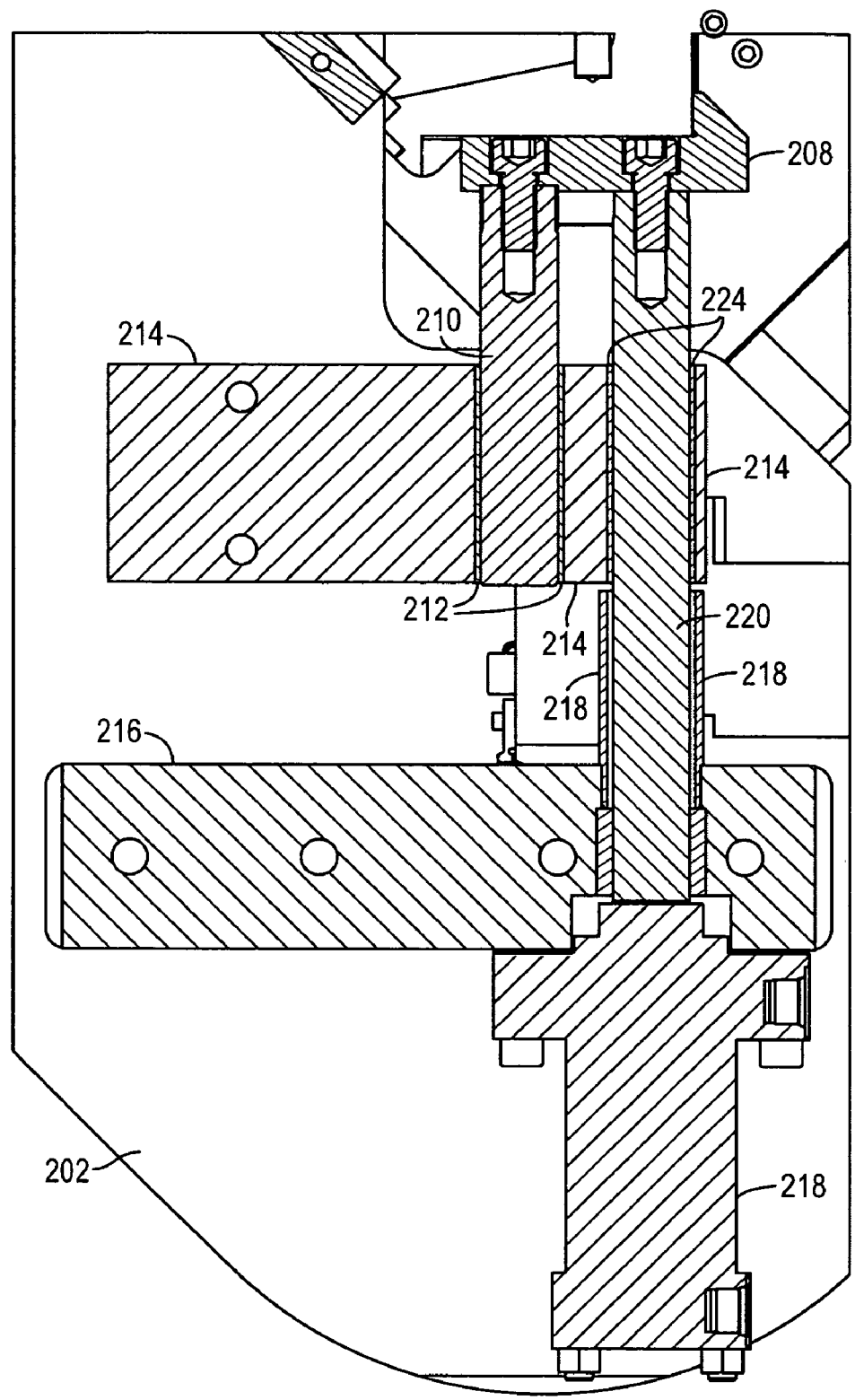
FIG. 6B is a fragmentary, cross-sectional view taken generally along the plane 6B-6B in FIG. 6A.
Figure 7:
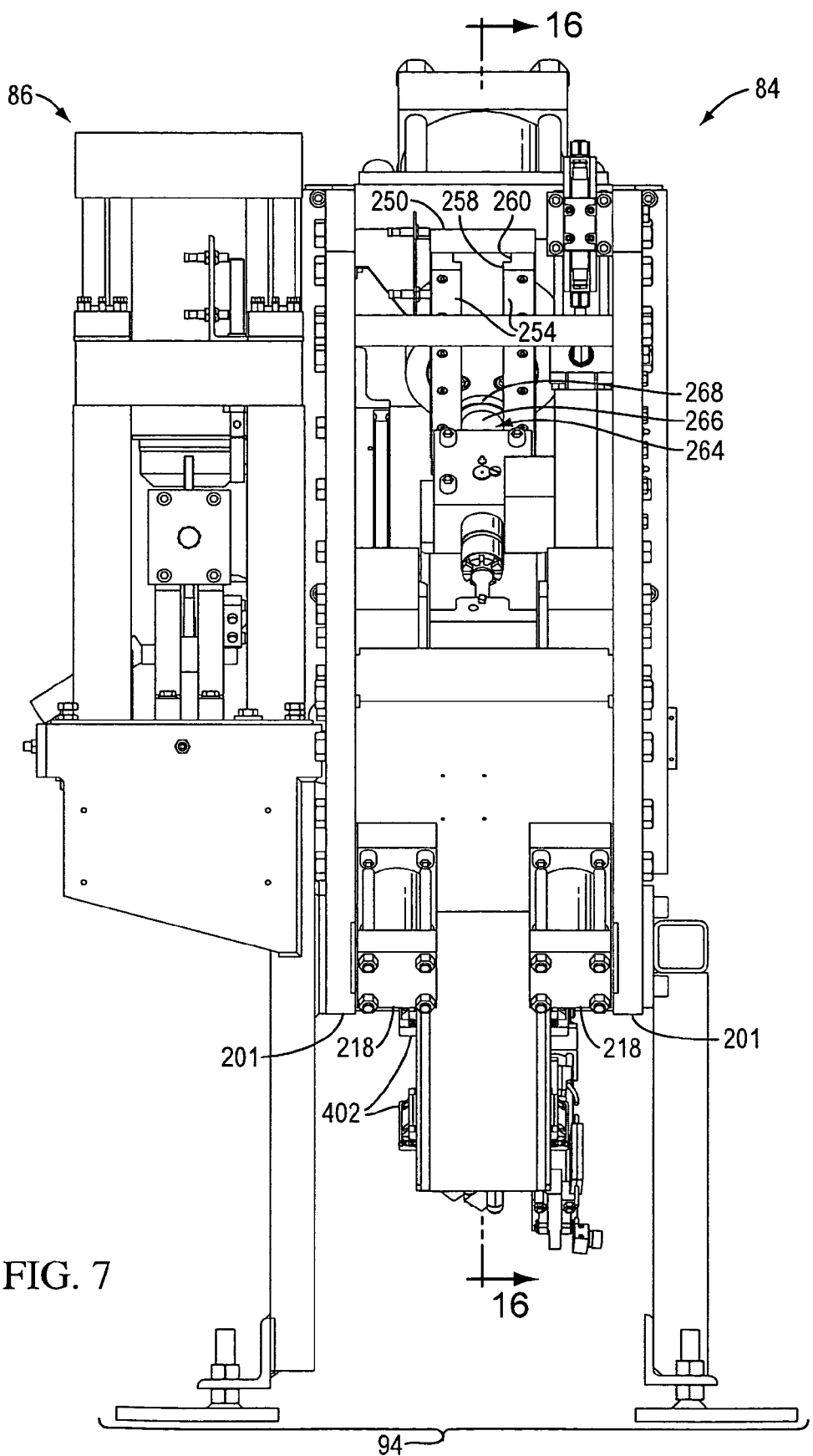
FIG. 7 is a side, elevational view taken generally along the plane 7-7 in FIG. 6.
Figure 26:
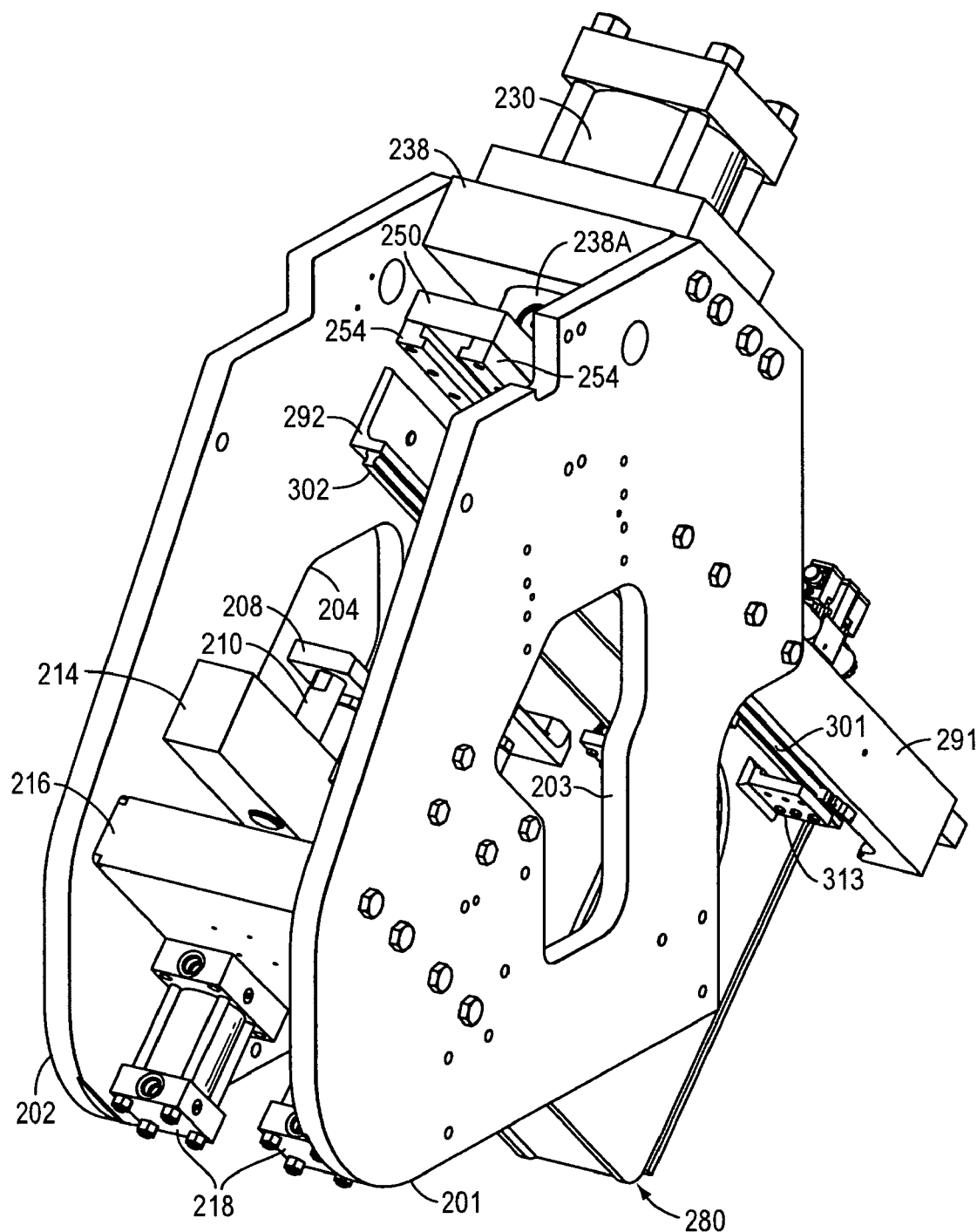
FIG. 26 is an isometric view of the sub-assembly of many of the machine components.
Figure 27:
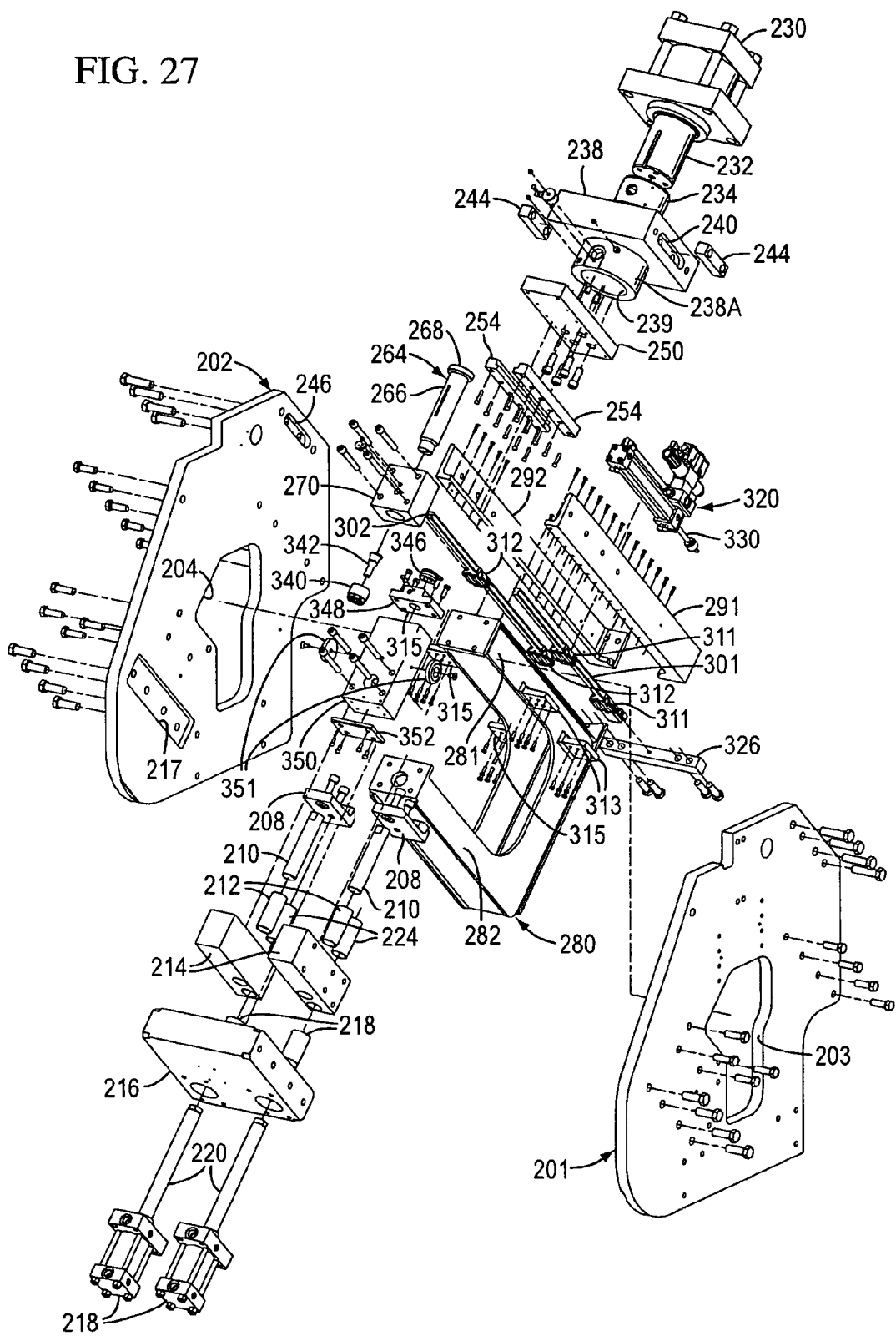
FIG. 27 is an exploded, isometric view of the sub-assembly illustrated in FIG. 26.

The combination punch press and drill machine 84 will next be described in more detail with reference to FIG. 7 and other figures identified hereinafter. As shown in FIG. 7, the machine 84 includes a support frame 94 adapted to support the machine on a floor. Attached to the support frame is a punch frame or first frame that includes an entry side plate 201 (FIGS. 6, 7, and 27) and an exit side plate 202 (FIGS. 7, 26, and 27). In the preferred embodiment illustrated, the side plates 201 and 202 are spaced apart, are parallel to each other, and are each perpendicular to the X-axis (with reference to FIG. 2). As can be seen in FIGS. 26 and 27, the entry side plate 201 includes an opening or aperture 203, and the exit side plate 202 includes an opening or aperture 204. The openings 203 and 204 accommodate passage and positioning of the structural angle 80 (FIG. 2) into and through the combination punch press and drill machine 84.

Figure 8:
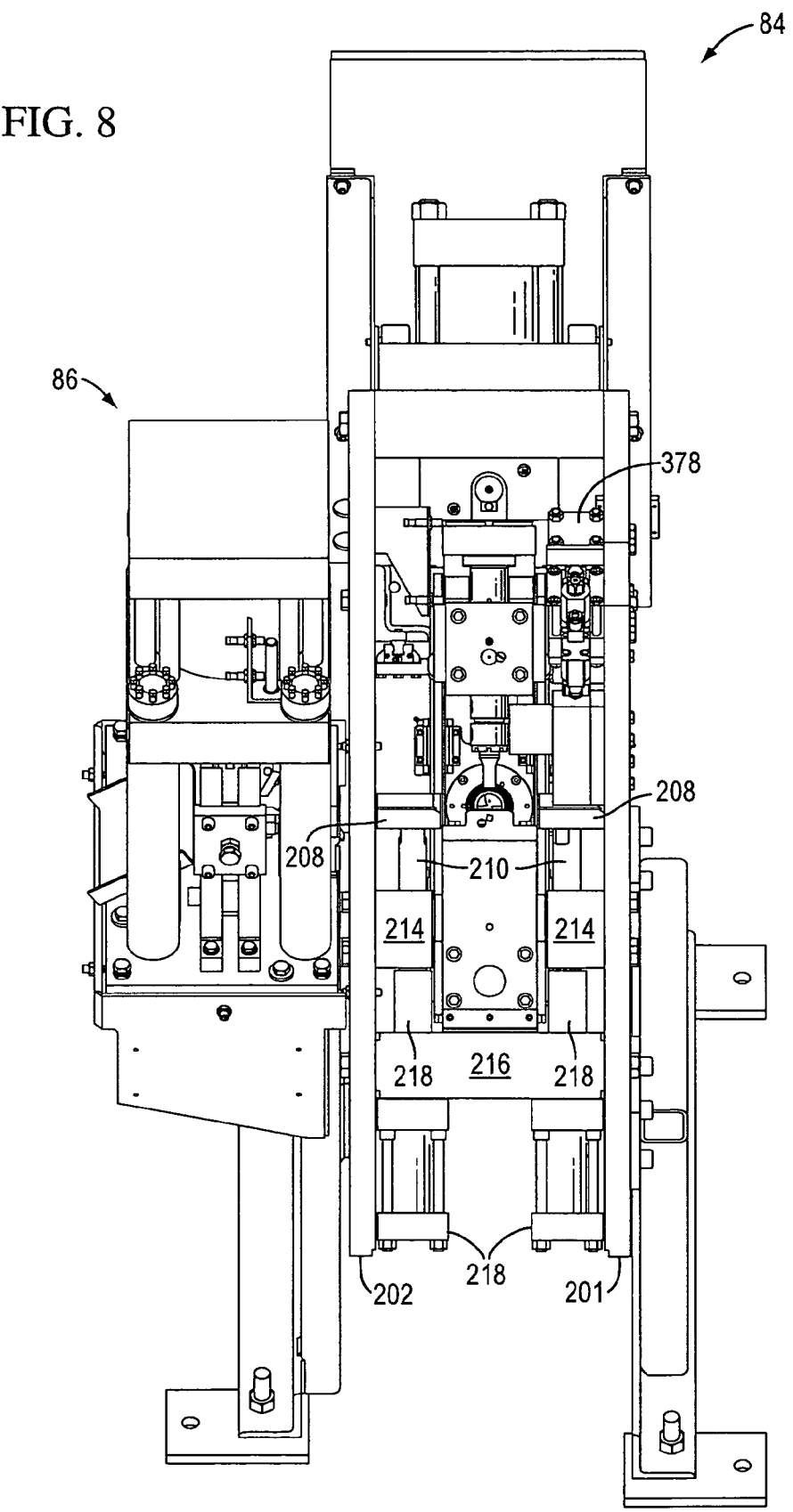
FIG. 8 is a view taken generally along the plane 8-8 in FIG. 6.
Figure 9:
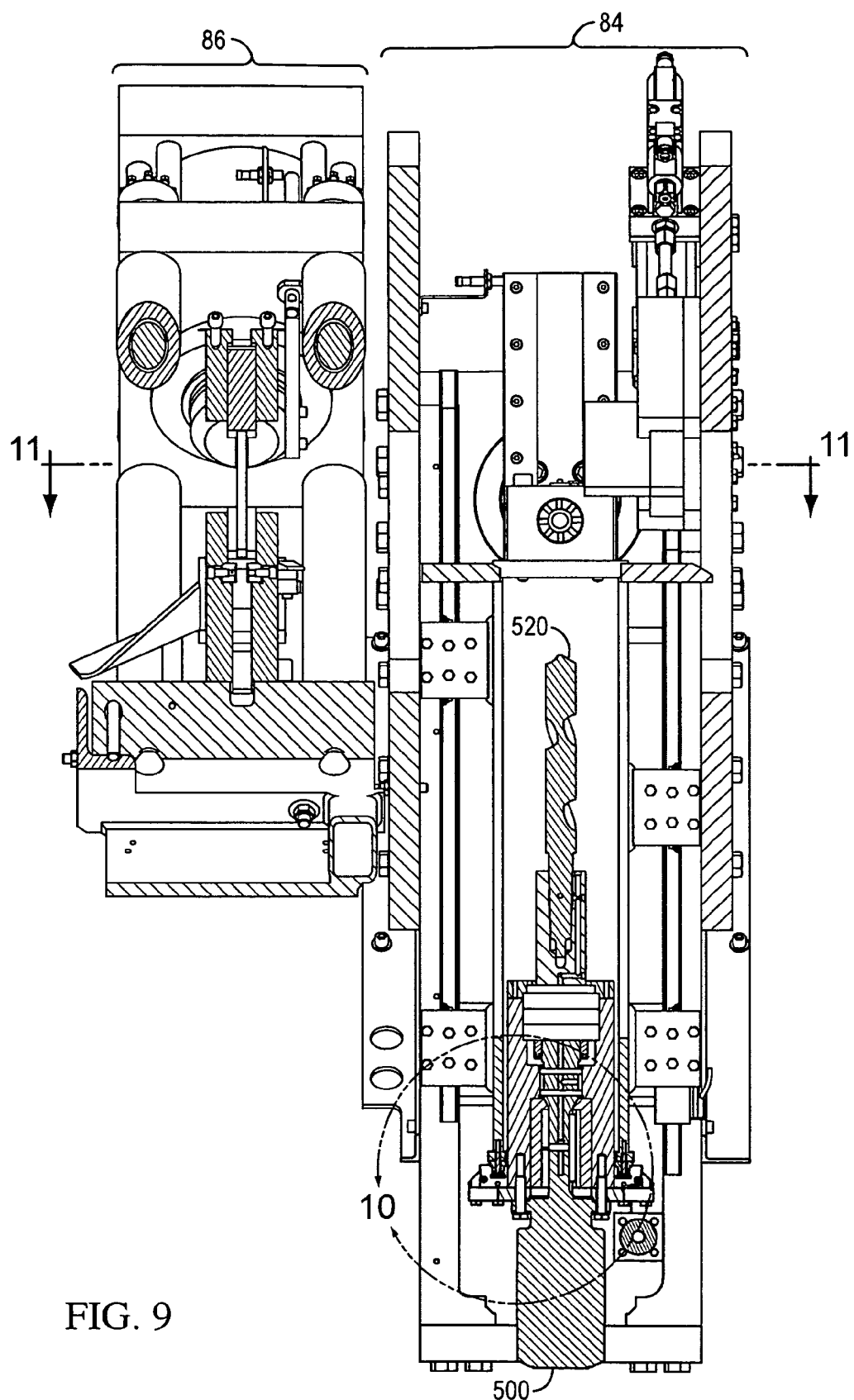
FIG. 9 is a cross-sectional view taken generally along plane 9-9 in FIG. 6.
Figure 18:
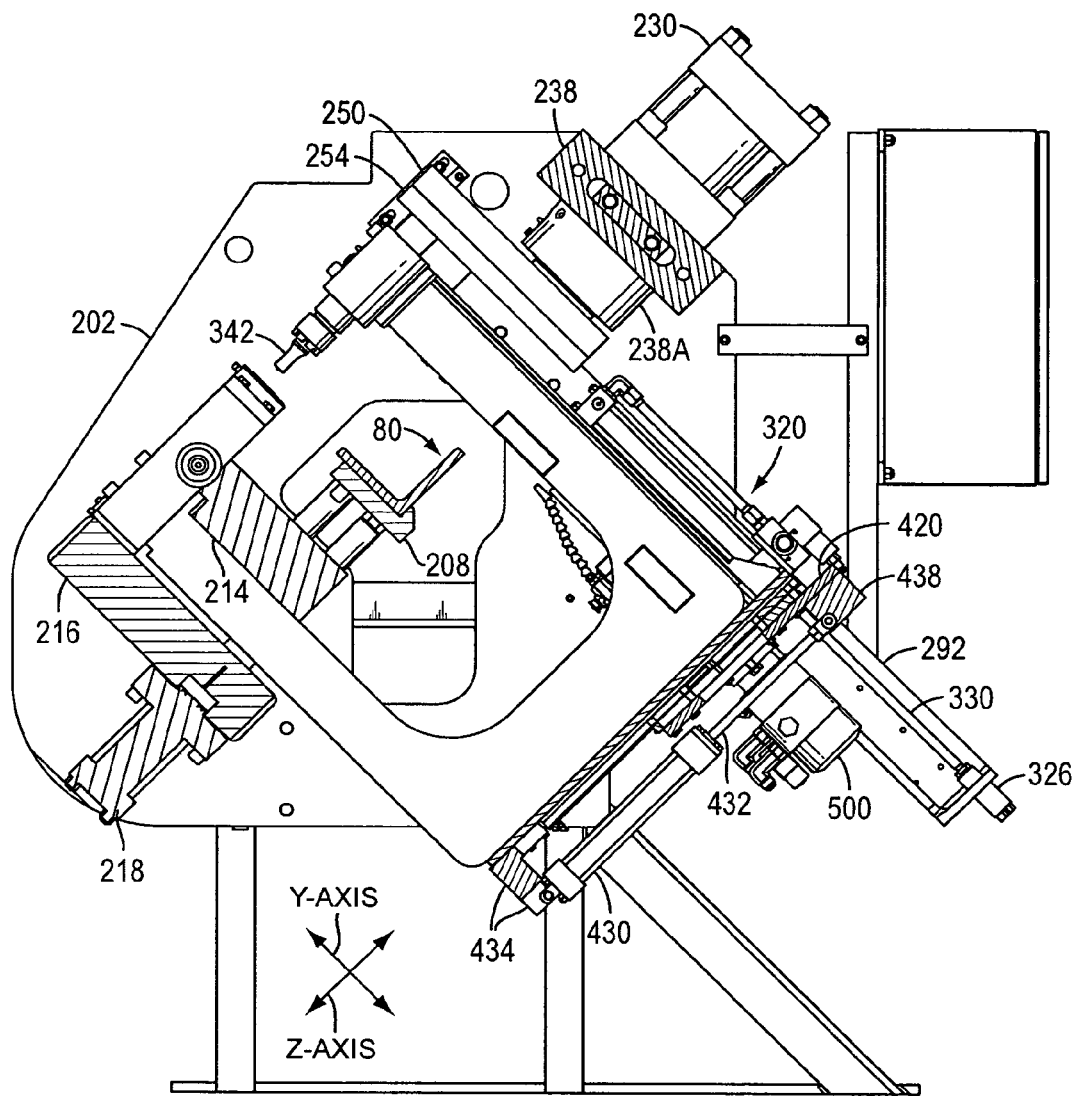
FIG. 18 is a cross-sectional view taken generally along the plane 18-18 in FIG. 17.
Figure 28:
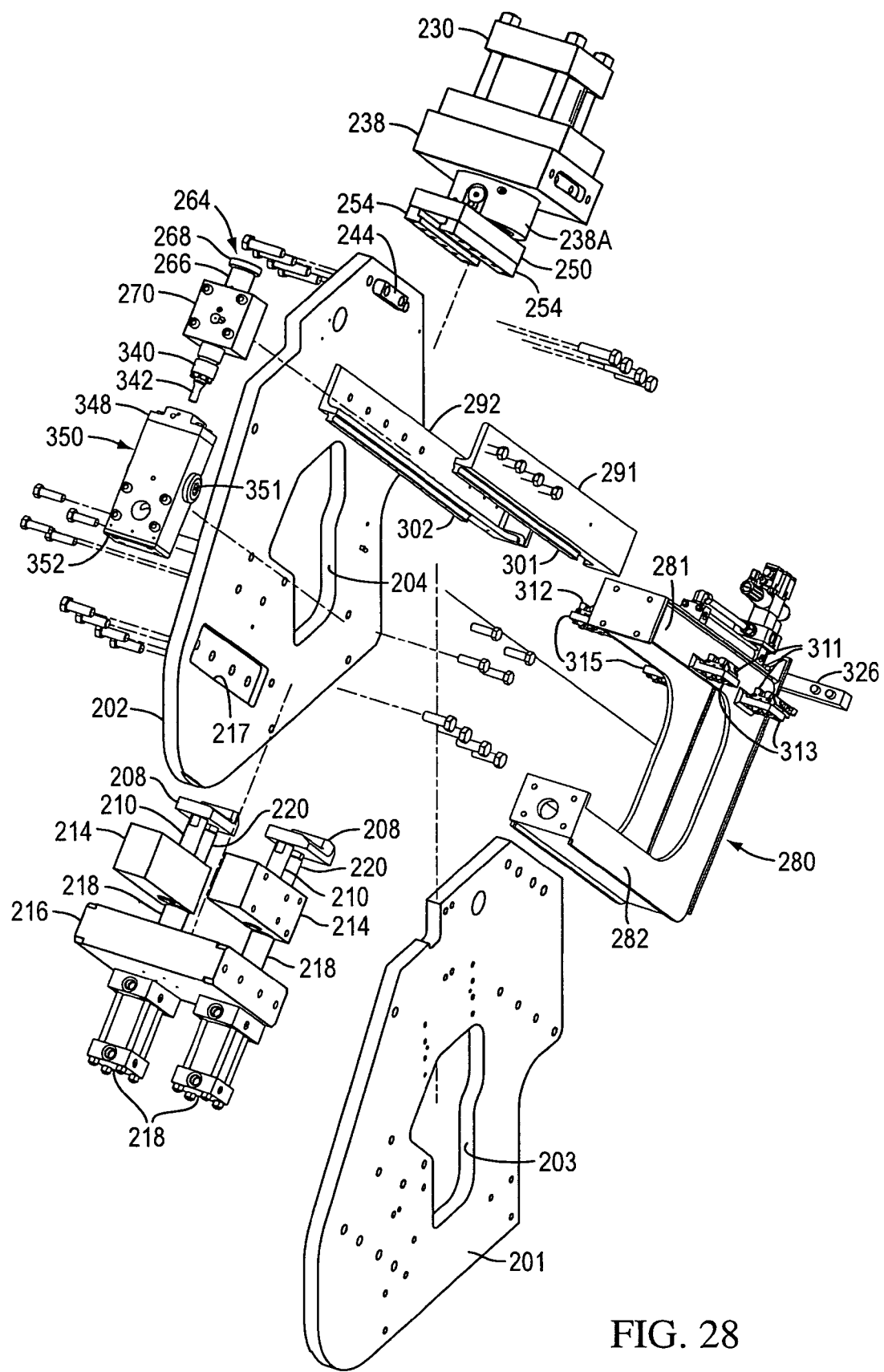
FIG. 28 is an enlarged, exploded, isometric view similar to FIG. 27, but FIG. 28 shows some of the components assembled.

As can be seen in FIGS. 8 and 18, the angle 80 is preferably supported in the machine 84 on one or more wear plates 208. FIGS. 8, 27, and 28 show the preferred arrangement employing two, spaced-apart wear plates 208. FIG. 27 shows that each wear plate 208 is mounted on an upper support shaft 210 which is received in an upper sleeve bearing 212 which is carried in an anvil mounting block 214. As can be seen in FIG. 8, one block 214 is mounted to the entry side plate 201, and a second block 214 is mounted to the exit side plate 202. The two blocks 214 are each spaced from a bolster block 216 (FIGS. 8 and 27) which is mounted between, and attached to, the entry side plate 201 and the exit side plate 202. The side plate 202 has a rectangular recess 217 (FIG. 27) for receiving the end of the bolster block 216, and the side plate 201 has a similar recess (not visible in FIG. 27) for receiving the other end of the bolster block 216.

Mounted to the bolster block 216 are two, anvil piston/cylinder actuators 218 (FIGS. 8 and 27). Each actuator 218 includes an outwardly extending piston 220 (FIG. 27) which extends through the bolster block 216 and through a cylinder rod guard 218 (FIG. 27) which extends between the bolster block 216 and one of the anvil mounting blocks 214 as can be seen in FIG. 8.

Each actuator piston 220 extends through a lower sleeve bearing 224 (FIG. 27) which is mounted in one of the anvil mounting blocks 214. The distal end of each anvil piston/cylinder actuator piston 220 is connected to one of the anvil wear plates 208. The actuators 218 can be operated to position the anvil wear plates 208 further forwardly or further rearwardly relative to the longitudinal movement path of the structural angle 80 (i.e., the anvil wear plates 208 can be moved along a path that is parallel to the Z-axis (FIGS. 2 and 18)). The anvil wear plates 208 can be retracted by the actuators 218 (at an angle downwardly along the Z-axis with reference to FIG. 18) to provide more clearance in the central region of the machine 84.

The anvil wear plates 208 are moved downwardly (i.e., retracted) parallel to the Z-axis as viewed in FIG. 18 when necessary to provide more clearance within the machine 82 as the trailing end of the structural angle 80 (the right-hand end of the angle 80 as viewed in FIG. 2) is moved by the gripping and advancing module 82 into the shear module 86 on the exit side of the machine 84. In particular, with reference to FIG. 31, the vertical gripper 160 of the carriage or gripper assembly 130 can be moved into the opening 203 of the first frame entry side plate 201 when the gripper assembly 130 is holding only a very short, remaining length of the structural angle 80, and the movement of the gripper assembly 130 into the opening 203 of the machine 84 permits the gripper assembly 130 to move the remaining short length of structural angle 80 into the shear module 86 (FIG. 3) at the exit of the punch press and drill module machine 84 so that the shear module 86 can shear a still shorter piece off of the remaining short length of structural angle 80 held by the vertical gripper 160. Retraction of the anvil wear plates 208 thus accommodates such advancement of the vertical gripper 160 into the machine 84 and very close to the shear module 86.

The particular design of the anvil actuators 218 forms no part of the present invention. Any suitable conventional or special actuator 218 may be employed. Indeed, according to the broadest aspect of the invention, an actuator system for retracting the anvil wear plates 208 is optional and could be omitted altogether. However, in the present preferred arrangement, each actuator 218 is a hydraulic actuator sold in the U.S.A. under the designation CDT4 series actuators by Bosch-Rexroth having an office at 5150 Prairie Stone Parkway, Hoffman Estates, Ill. 60192-3707, U.S.A.

Figure 11:
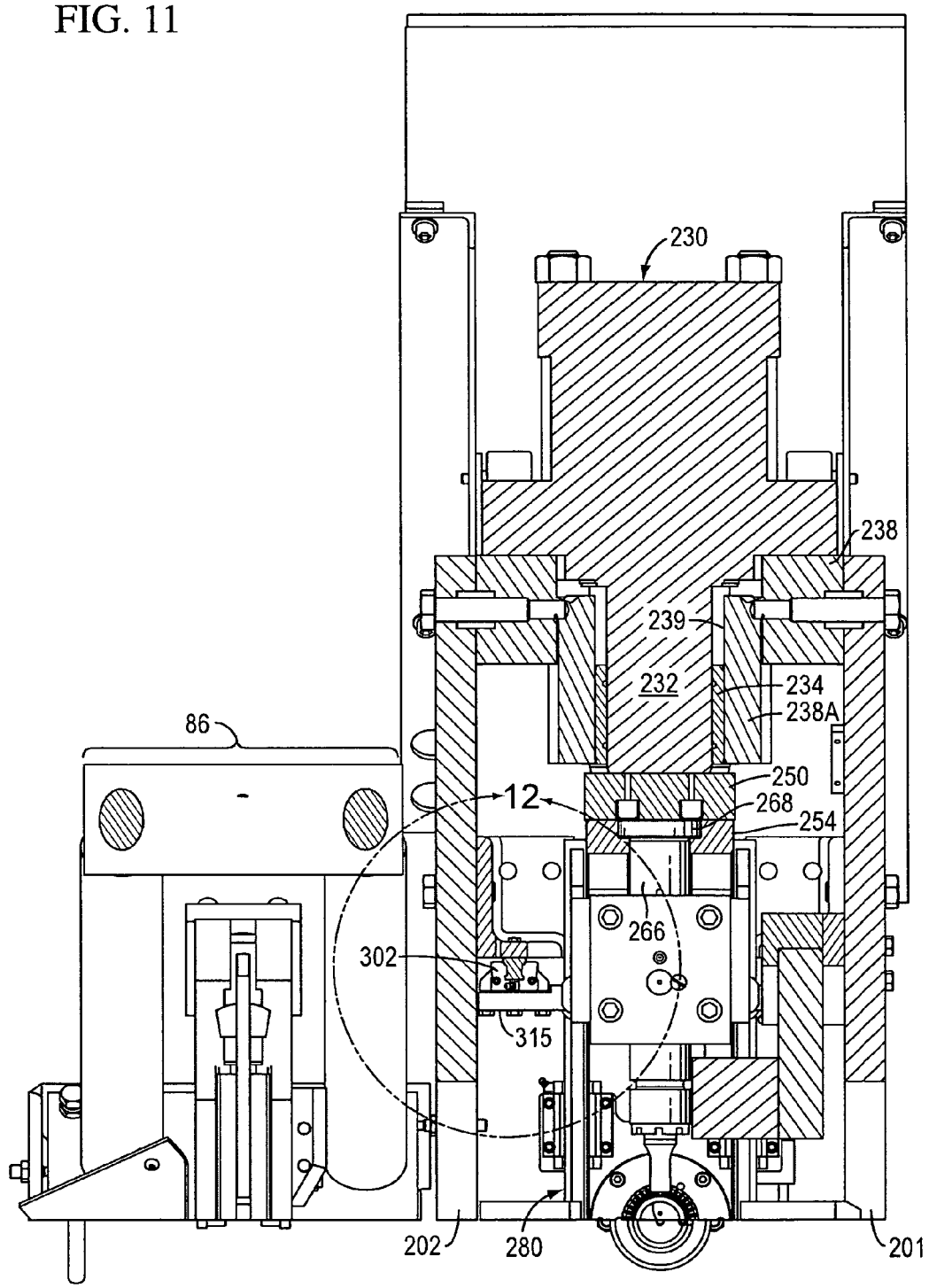
FIG. 11 is a cross-sectional view taken generally along the plane 11-11 in FIG. 9.

The first frame entry side plate 201 and exit side plate 202 also support the punch piston/cylinder actuator 230 (FIG. 27) and related components. As can be seen in FIGS. 11 and 27, the actuator 230 includes an extending piston rod 232 which is received in a ram bushing 234 mounted in a bore 239 defined in a collar portion 238A of a support weldment 238. In FIGS. 8, 13, 14, 16, 19, 21, 22, and 23, the internal cosssectional details of the actuator 230 have been omitted for ease of illustration. The weldment 238 includes a pair of oppositely facing side recesses 240 (one of which is visible on the right-hand side in FIG. 27). Each recess 240 receives a block or key 244. As can be seen in FIG. 27, the upper end of the exit side plate 202 defines a recess 246 for receiving one of the keys 244. The entry side plate 201 has a similar recess (not visible in FIG. 27) for receiving the other key 244. The support weldment 238 is bolted to the entry side plate 201 and exist side plate 202 with the keys 244 in position in the mating recesses to provide a rigid structure.

Figure 15:
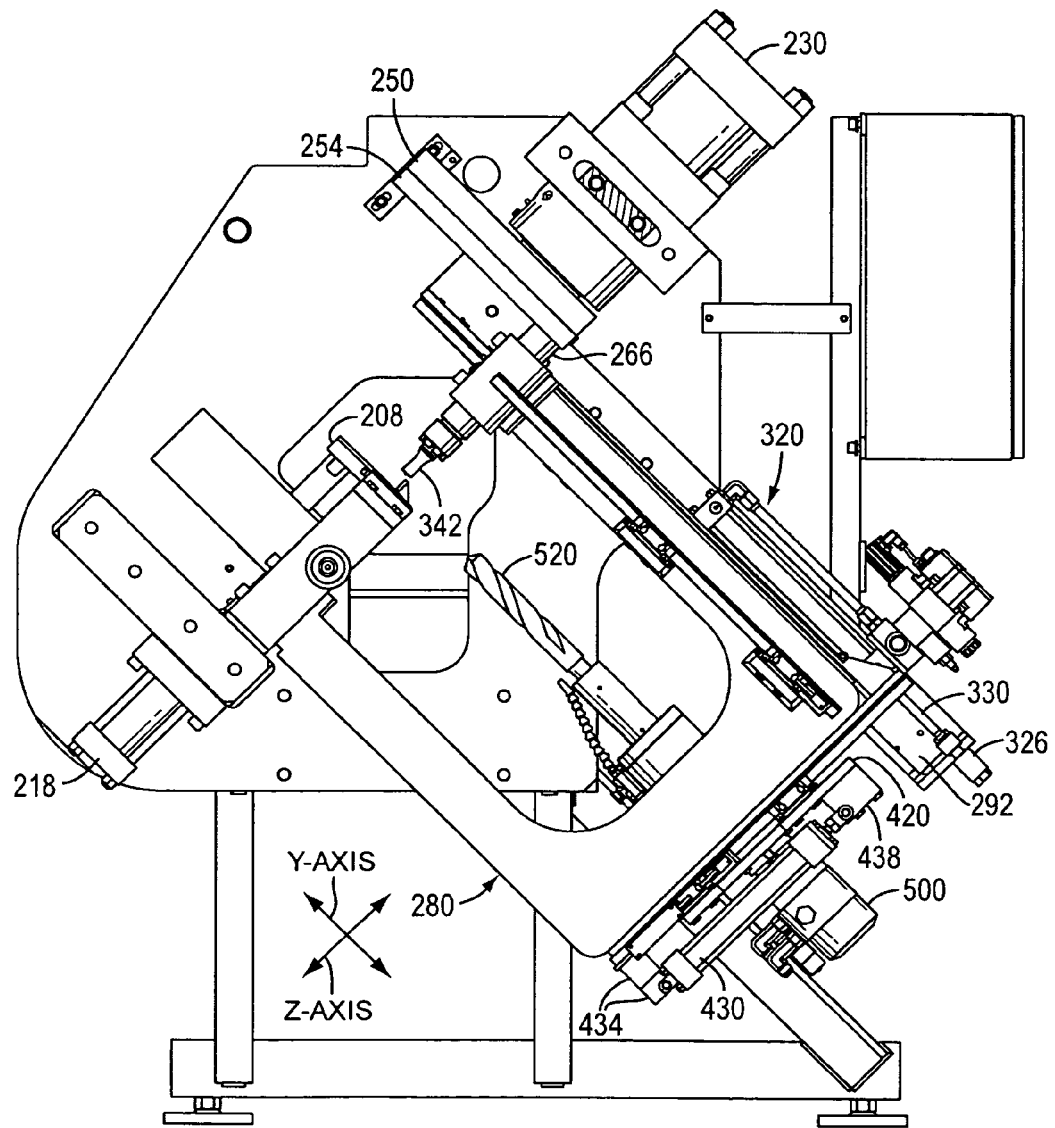
FIG. 15 is a view similar to FIG. 13, but in FIG. 15 the structural angle has been omitted, the punch press frame ("second" frame or C-frame) has been moved relative to the main frame ("first" frame) to the fully retracted position along the Y-axis, and the drill carriage is at the fully retracted position along the Z-axis.
Figure 16:
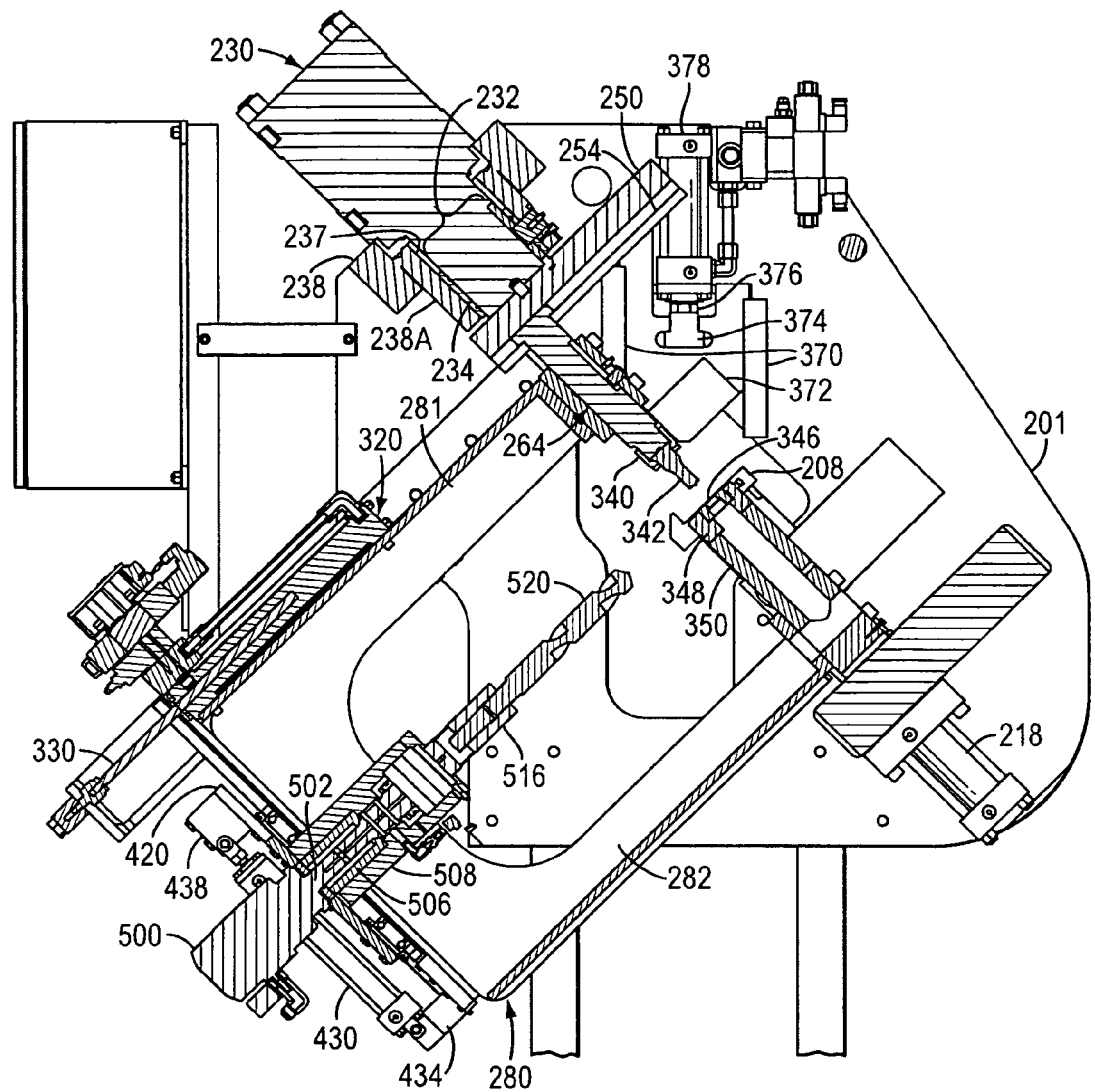
FIG. 16 is a fragmentary view taken generally along the plane 16-16 in FIG. 7, but with the punch press frame ("second" frame or C-frame) moved relative to the main ("first" frame) to the fully retracted position along the Y-axis, and wherein the drill carriage is at the fully retracted position along the Z-axis.
Figure 17:
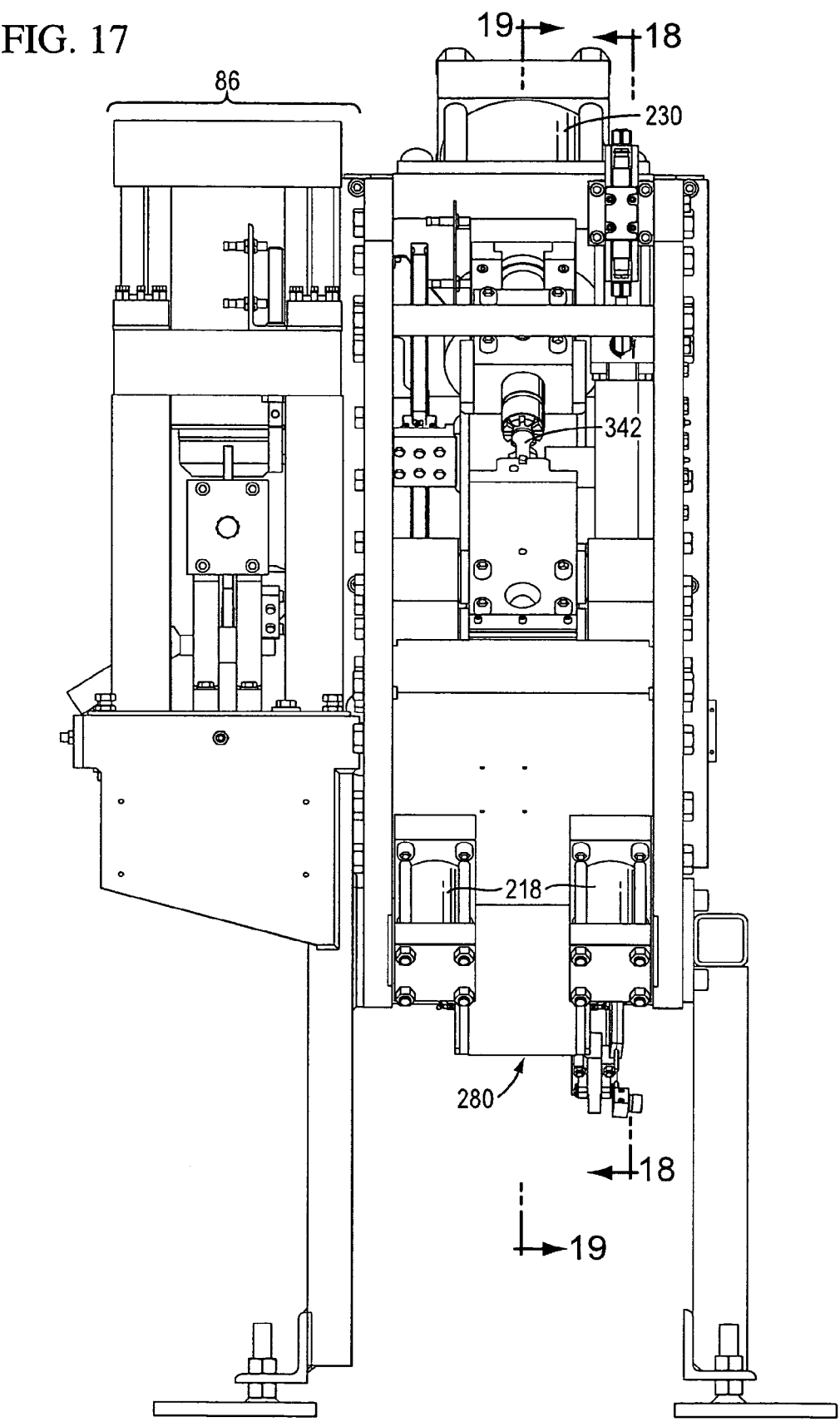
FIG. 17 is a view similar to FIG. 7, but FIG. 17 shows the machine components moved to the fully extended positions in the Y-axis and Z-axis directions.

As can be seen in FIGS. 11, 27 and 28, the actuator piston rod 232 extends through the bushing 234 of the collar 238A of the support weldment 238. The distal end of the piston rod 232 of the actuator 230 is bolted to a slide top plate 250. A pair of side bars 254 are mounted to the top plate 250. As can be seen in FIGS. 7 and 28, each side bar 254 has a laterally projecting flange, and the assembly of the side bars 254 with the top plate 250 may be characterized as a guideway that defines a guideway slot having a T-shaped transverse shape having a narrow channel 258 and a wide channel 260 (FIG. 7). With reference to FIGS. 15 and 16, the slot defined by the plate 250 and bars 254 extends lengthwise generally parallel to the Y-axis.

The T-shaped guideway slot defined by the channels 258 and 260 is adapted to receive the proximal end of a punch ram 264 (FIGS. 7, 27, and 28). The punch ram 264 has a proximal shaft portion 266 extending into the guideway slot wide channel 258 and has an enlarged diameter base 268 on the proximal end of the shaft proximal portion 266 which is received in the guideway slot wide channel 260. The slot channels 258 and 260 accommodate movement of the entire ram 264 upwardly and downwardly to a desired location along the Y-axis (e.g., in FIG. 25 the ram shaft portion 266 is visible at an upwardly extended location along the Y-axis, and in FIG. 15 the ram shaft portion 266 is shown at a retracted position along the Y-axis). The ram 264 is longitudinally aligned parallel to the Z-axis and defines the punch operational axis parallel to the Z-axis.

The ram 264 is adapted to be operable with other punch components to punch holes in the structural angle. To this end, the ram 264 is slidably received in, and supported by, a block 270 (FIG. 27) which is mounted in a second frame that includes a generally U-shaped portion 280 which may be also characterized as a C-frame. The U-shaped portion or C-frame 280 has two, spaced-apart legs 281 and 282 that extend generally parallel to the Y-axis, and the block 270 is bolted to the distal end of the leg 281 of the C-frame 280.

Figure 12:
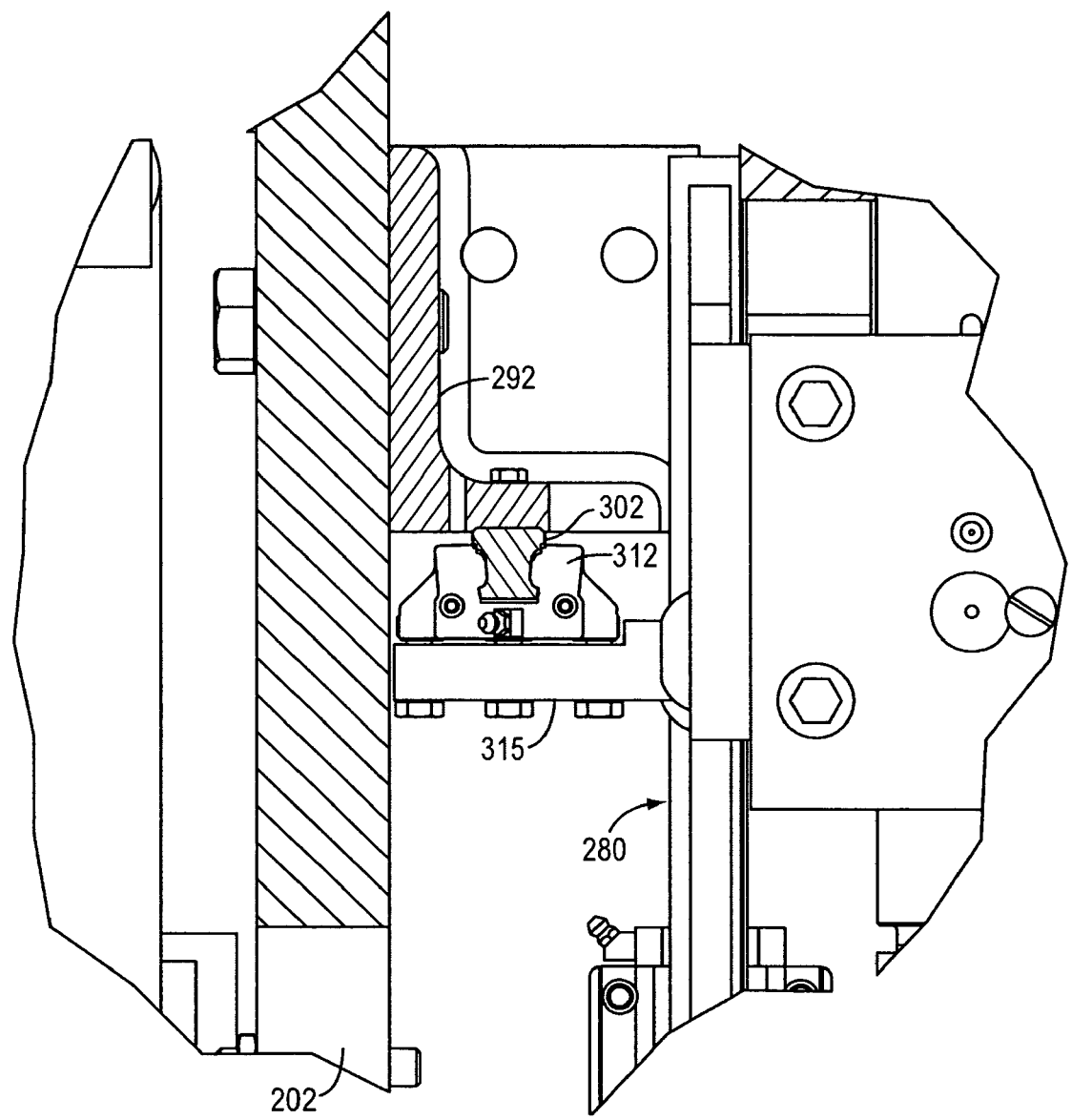
FIG. 12 is an enlarged, cross-sectional view of the area within the circle designated 12 in FIG. 11.

The C-frame 280 is disposed between the first frame entry side plate 201 and first frame exit side plate 202. The C-frame 280 is adapted to be moved relative to the first frame side plates 201 and 202 in directions parallel to the Y-axis. To this end, as illustrated in FIGS. 11, 12, and 27, a first rail support 291 is bolted to the first frame entry side plate 201, and a second rail support 292 is bolted to the first frame exit side plate 202. A first linear rail 301 is mounted to the first rail support 291, and a second linear rail 302 is mounted to the second rail support 292. As can be seen in FIGS. 11, 12, 27, and 28, on the entrance side of the C-frame 280 there are two linear bearings 311 mounted to flanges 313 on the first leg 281 of the C-frame 280, and the bearings 311 are slidably engaged with the first rail 311. Similarly, on the exit side of the C-frame 280, there are two linear bearings 312 mounted to flanges 315 on the C-frame second leg 282, and the linear bearings 312 are slidably engaged with the second rail 302. This mounting configuration accommodates movement of the C-frame 280 in directions parallel to the Y-axis (i.e., at an angle upwardly to the left as viewed in FIG. 15 or at an angle downwardly to the right as viewed in FIG. 15).

Figure 13:
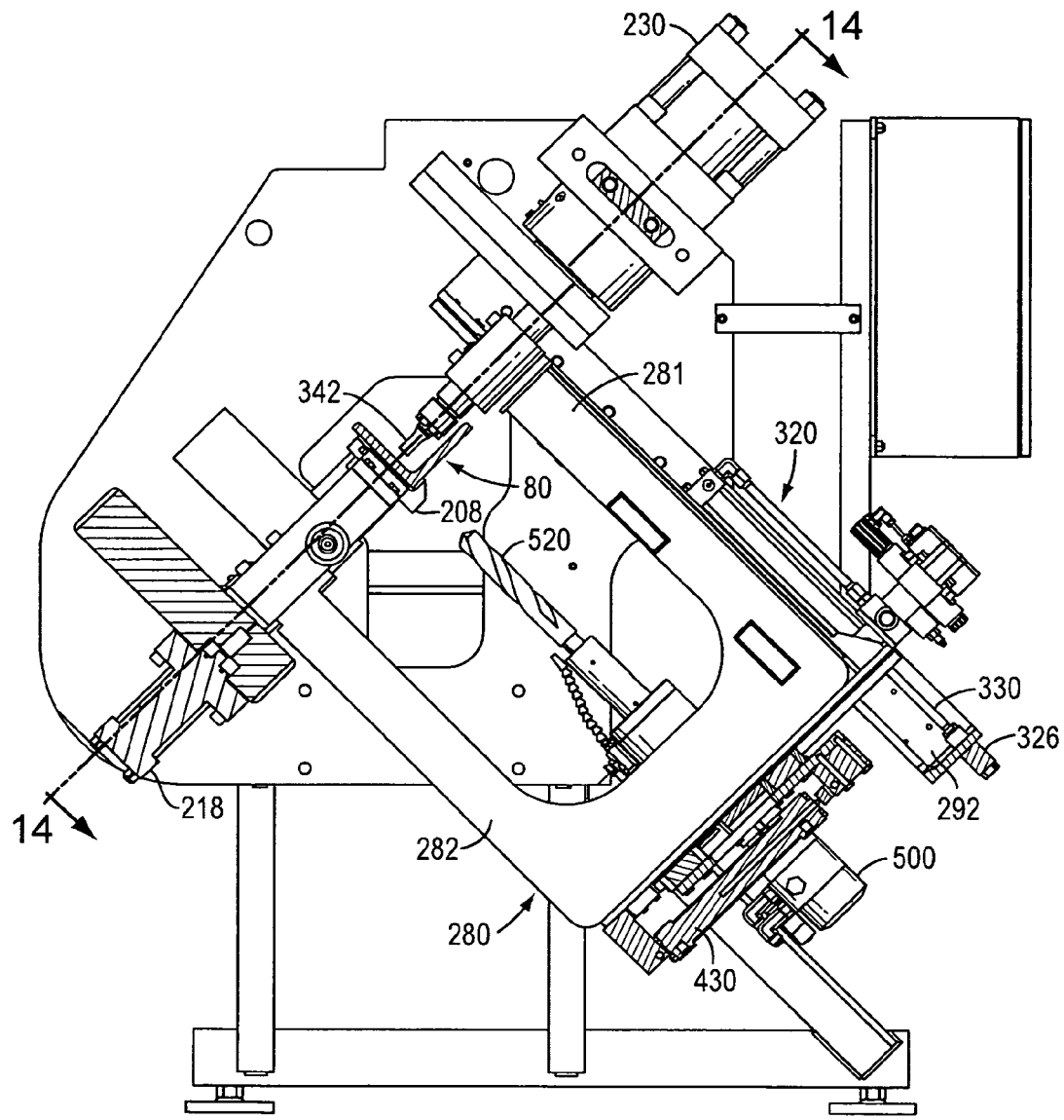
FIG. 13 is a cross-sectional view taken generally along the plane 13-13 in FIG. 3.

The C-frame 280 is movable to a desired location along the Y-axis by a piston/cylinder actuator 320 (FIG. 27). As can be seen in FIGS. 27 and 13, a cross strut or member 326 is bolted at one end to the bottom of the first rail support 291, and is bolted at the other end to the bottom of the second rail support 292. The actuator 320 has a projecting piston rod 330 which is attached at its distal end to the cross member 326 as shown in FIG. 13. The cylinder of the actuator 320 is mounted to the C-frame first leg 281 as shown in FIG. 13. The actuator 320 can be operated to extend the piston rod 330 so as to move the C-frame 280 parallel to the Y-axis to an extended position (FIG. 18). The actuator 320 can be operated to retract the piston rod 330 so as to move the C-frame 280 parallel to the Y-axis to a fully retracted position (FIG. 15). The actuator 320 may be of any suitable, conventional or special design, the details of which form no part of the present invention. In one preferred form of the machine 84, the actuator 320 is a hydraulic piston/cylinder actuator sold in the U.S.A. under the designation CDT4 series actuators by Bosch-Rexroth having an office at 5150 Prairie Stone Parkway, Hoffman Estates, Ill. 60192-3707, U.S.A.

The movable C-frame 280 carries the previously described block 270, ram 264, and the other components of the punch system that cooperate with the ram 264 and which will next be described. With reference to FIG. 27, a coupling nut 340 attaches the distal end of the ram 264 to the base of a punch tool or punch 342 (FIG. 16). The punch 342 is adapted to punch through the structural angle 80 (FIG. 23) into a die 346 (FIGS. 16 and 27 which is carried in a die holder 348 that is mounted to the front of a die stand 350 that is bolted to the distal end of the C-frame leg 282. Two round wear pads 351

(FIG. 27) are mounted to the sides of the die stand 350, and a rectangular wear pad 352 is mounted to the rear end of the die stand 350.

Because the punch ram 264, slide block 270, punch 342, die 346, die holder 348, die stand 350, pads 351, and pad 352 are carried on the C-frame 280, those punch system components can be moved to any location along the Y-axis with the C-frame 280. In contrast, however, the punch actuator 230, piston rod 232, support weldment 238, top plate 250, and side bars 254 all do not move along the Y-axis. Instead, the punch actuator 230 and support weldment 238 remain fixed between the first frame side plates 201 and 202. The piston rod 232, along with the top plate 250 and side bars 254, which are carried by the piston rod 232, can move parallel to the Z-axis, but cannot move parallel to the Y-axis. The top plate 250 and side bars 254 will accommodate Y-axis movement of the other punch system components that are mounted on the C-frame 280 owing to the guiding of the punch ram base 268 in the channel between the side bars 254. However, operation of the punch actuator 230 in the direction parallel to the Z-axis will move the punch ram 264 along its longitudinal axis (parallel to the Z-axis) to punch a hole in the structural angle (FIGS. 21-23) as described in more detail hereinafter.

The particular design of the punch actuator 230 forms no part of the present invention. Any suitable conventional or special actuator may be employed. In one presently preferred embodiment, the actuator 230 is a hydraulic actuator sold in the U.S.A. under the designation CDT4 series actuators by Bosch-Rexroth having an office at 5150 Prairie Stone Parkway, Hoffman Estates, Ill. 60192-3707, U.S.A.

Figure 22:
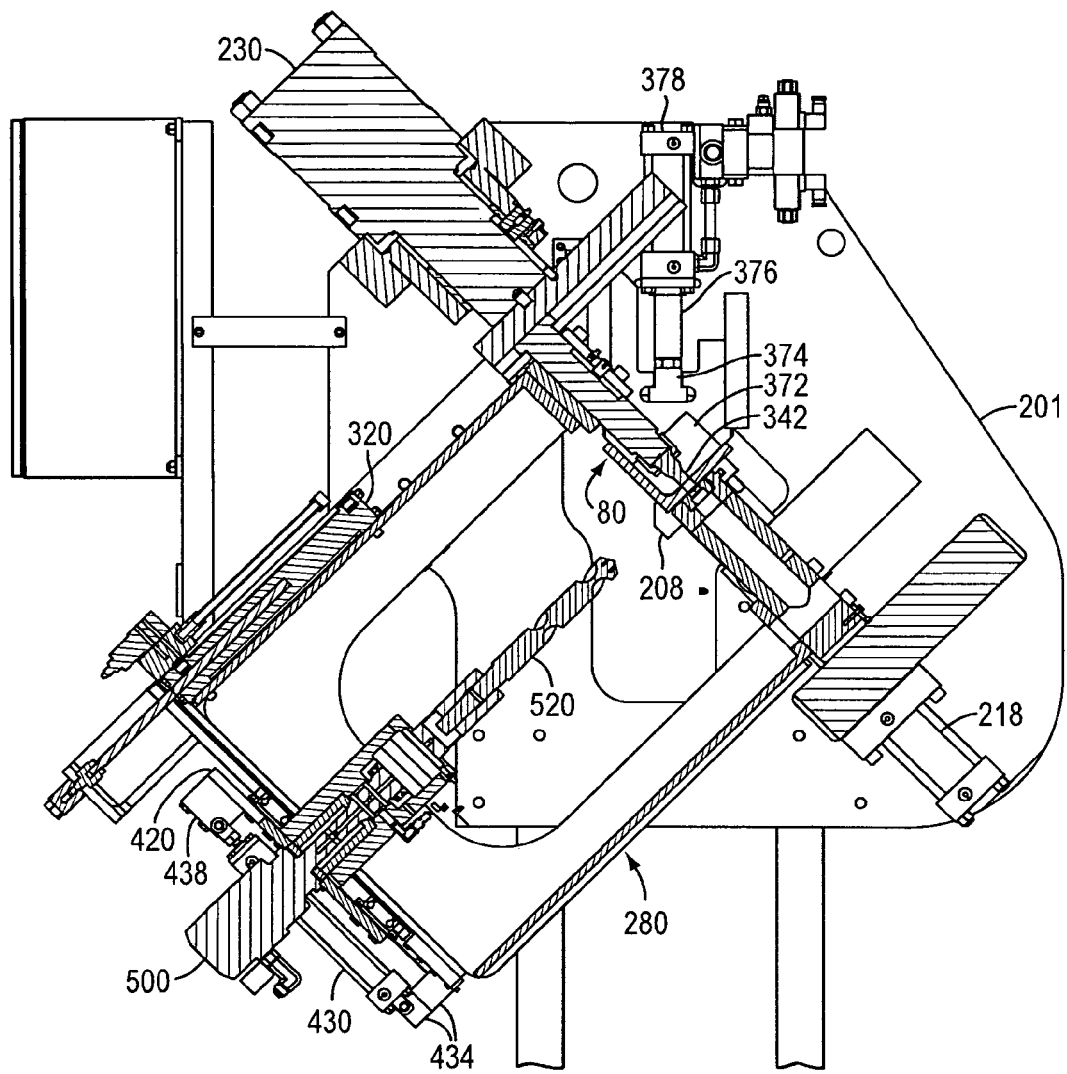
FIG. 22 is a fragmentary, cross-sectional view taken generally along the plane 22-22 in FIG. 20 wherein the punch is shown extending through the structural angle first leg.
Figure 23:
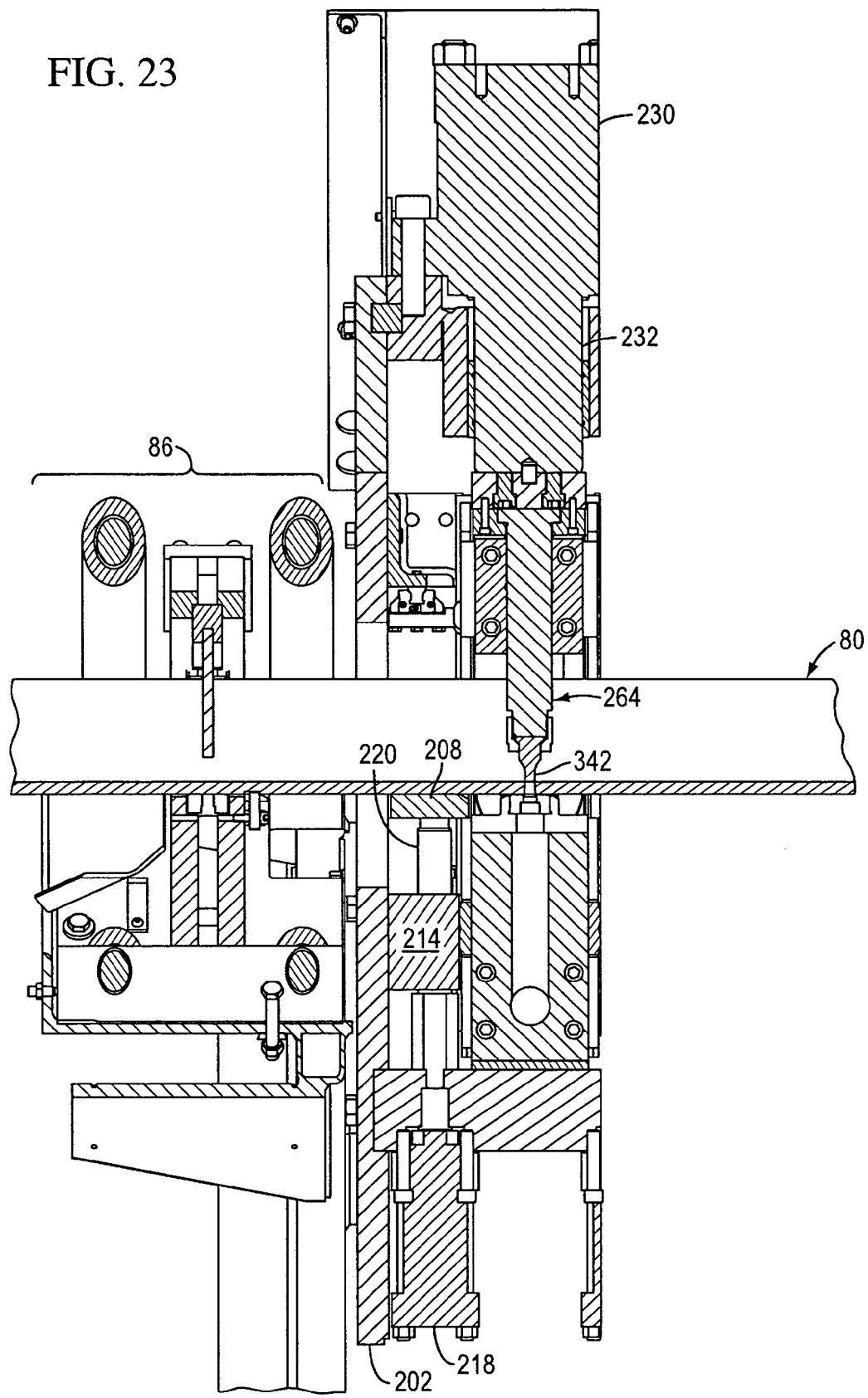
FIG. 23 is a cross-sectional view taken generally along the plane 23-23 in FIG. 21.

To assist in retraction of the punch 342 from the hole in the structural angle 80 after the structural angle 80 has been punched, the preferred embodiment of the machine 84 includes a hold-down system for engaging, and holding down, the structural angle 80 as the punch 342 is withdrawn. With reference to FIGS. 16 and 22, the hold-down system includes a pair of guide rails 370 mounted to the first frame entry side plate 201 for guiding a clamp plate 372 which is mounted on a retainer head 374 secured to the piston 376 of a piston/cylinder actuator 378. The actuator 378 is mounted to the first frame entry side plate 201. The actuator 378 can be operated to move the clamp member 372 downwardly against the inside of the V-shaped surface of the structural angle and hold the angle against the wear plates 208 as, and after, the angle is punched (compare FIG. 16 (before punching) with FIG. 22 (after punching)). This permits the punch actuator 230 to be operated to withdraw, or strip, the punch 342 from the angle 80 while the angle 80 remains held against the wear plates 208 by the clamp member 372. The actuator 378 may be of any suitable, conventional or special design, the details of which form no part of the present invention. In one preferred form of the machine 84, the actuator 378 is a hydraulic piston/cylinder actuator sold in the U.S.A. under the designation CDT4 series actuators by Bosch-Rexroth having an office at 5150 Prairie Stone Parkway, Hoffman Estates, Ill. 60192-3707, U.S.A. The other components of the hold-down clamping system for accommodating stripping of the punch 342 may be of any suitable conventional or special design, the details of which form no part of the present invention.

Figure 29:
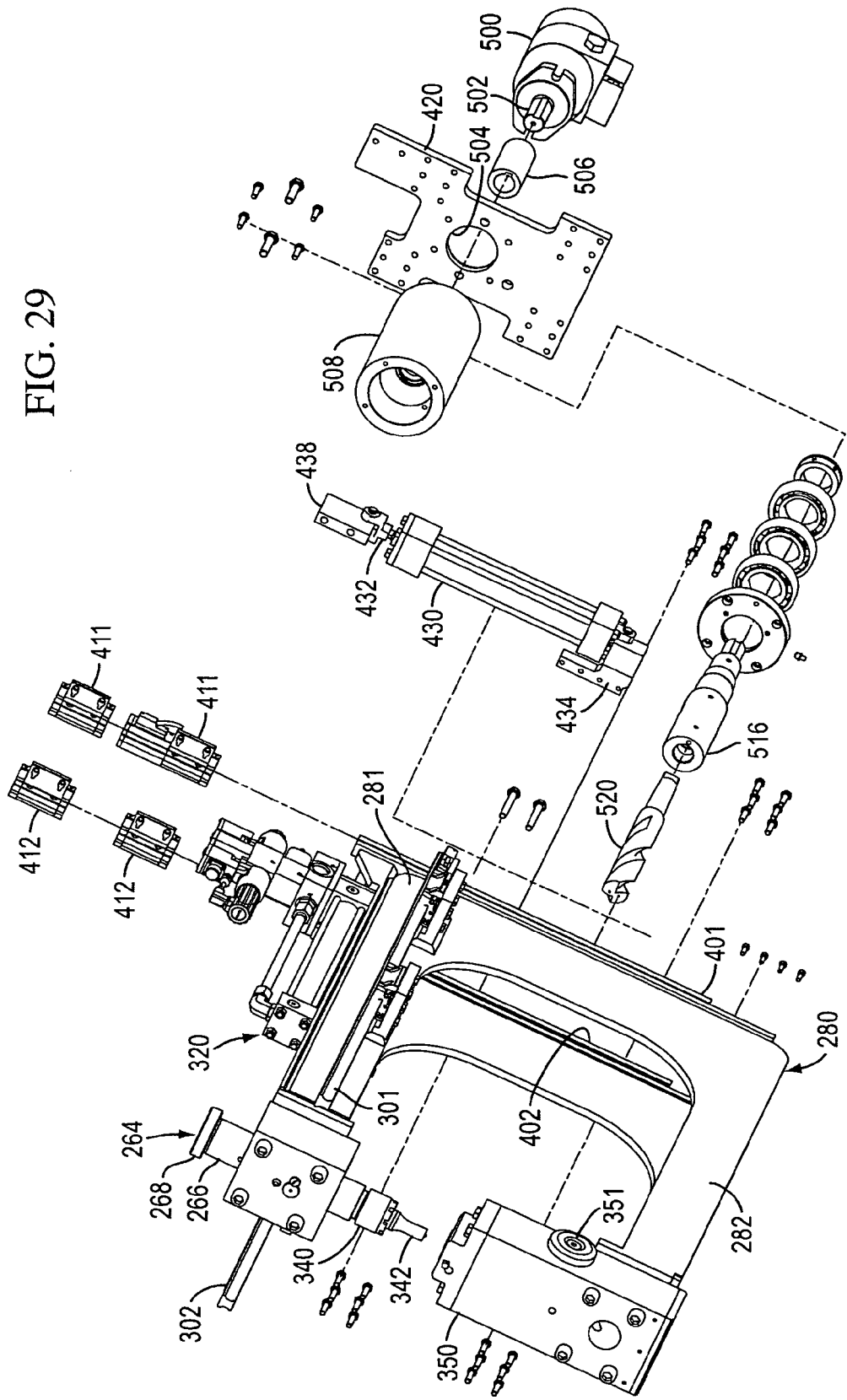
FIG. 29 is an exploded, isometric view of some of the components illustrated in FIGS. 13 and 28, and FIG. 29 further shows the components of the drill.

The system for drilling holes in the structural angle 80 will next be described. For ease of illustration, the drilling system components have been omitted from some of the Figures, such as FIG. 26 and the exploded views of FIGS. 27 and 28. However, FIG. 29 shows the drilling system components exploded away from the U-shaped frame or C-frame 280, and when the components are assembled and mounted on the C-frame 280, the assembled drill system components may be regarded as a "drill assembly." With continued reference to FIG. 29, two, spaced-apart, parallel linear rails 401 and 402 are mounted to the bottom portion of the C-frame 280 that extends between the two frame legs 281 and 282. (The linear rails 401 and 402 have been omitted from FIGS. 27 and 28 for ease of illustration.)

As shown in FIG. 29, a pair of linear bearings 411 are adapted to be slidably disposed on the linear rail 401, and a pair of linear bearings 412 are adapted to be slidably disposed on the linear rail 402. A mounting plate or carriage 420 (FIG. 29) is adapted to be mounted to the linear bearings 411 and 412 as shown in FIGS. 6 and 18. The plate or carriage 420 is movable along the Z-axis by an actuator 430 (FIGS. 6 and 29). The actuator 430 may be of any suitable conventional or special design, the details of which form no part of the invention, In the preferred embodiment of the machine illustrated, the actuator 430 is the type of hydraulic piston/cylinder actuator sold by Bosch-Rexroth referred to above with reference to the previously described actuators 218, 230, 320, and 378.

The cylinder end of the actuator 430 is attached to a block 434 which is mounted at a fixed location to the C-frame 280 (as shown in FIGS. 6 and 18). The actuator 430 includes a projecting piston rod 432 having a distal end connected to a mounting plate 438 (FIGS. 6, 18, and 29). As can be seen in FIGS. 6 and 18, the mounting plate 438 is bolted to the movable carriage 420. Thus, operation of the actuator 430 will extend or retract the actuator piston rod 438 to thereby move the carriage 420 to desired locations along the Z-axis (which is parallel to the longitudinal operational axis of the punch).

As can be seen in FIG. 29, a drill motor 500 is provided for mounting to the carriage 420. The drill motor 500 may be of any suitable conventional or special design, the details of which form no part of the present invention. In the figures showing the drill in cross section, internal details have been omitted for ease of illustration. In the preferred embodiment of the machine illustrated, the drill motor 500 is a hydraulic drill motor sold in the U.S.A. under the designation or model number 708-108-AS-0-NOL-F by Parker-Hannifin having an office at 6035 Parkland Blvd., Cleveland, Ohio 44124, U.S.A.

Figure 10:
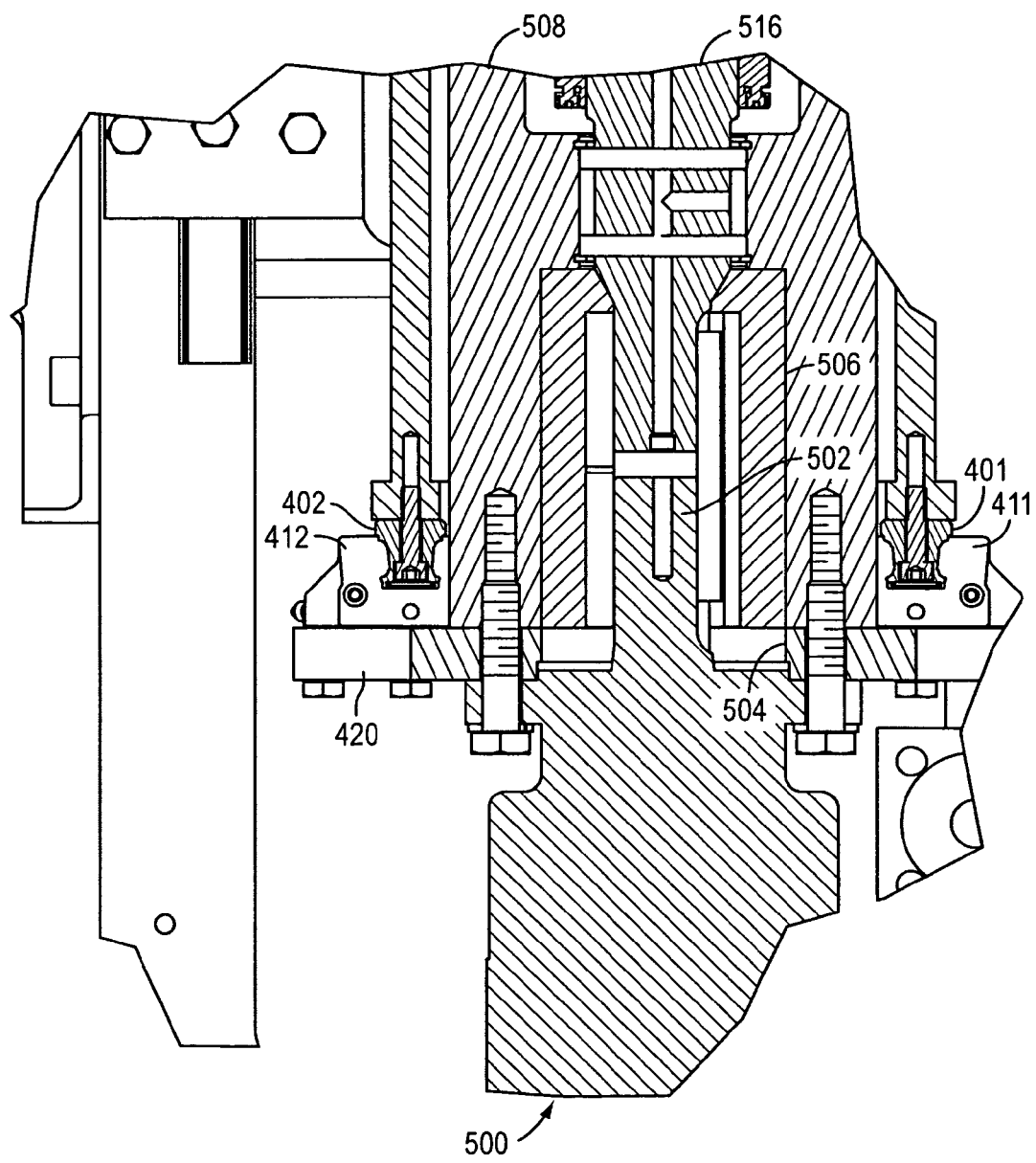
FIG. 10 is a fragmentary, enlarged view of the area shown within the circle designated 10 in FIG. 9.

As shown in FIGS. 10 and 29, the plate or carriage 420 has a central aperture 504 for accommodating a shaft 502 projecting from the drill motor 500 (FIG. 16). As can be seen in FIGS. 10, 16 and 29, a sleeve 506 is mounted around the end of the drill motor shaft 502 and is received within a coupling housing 508. A chuck 516 (FIGS. 16 and 29) is connected through the housing 508 to the drill motor 500 and receives a drill or drill bit 520 (FIGS. 16 and 29). The drill or drill bit 520 and components for attaching the drill bit to the drill motor 500 may be of any suitable conventional or special design, the details of which form no part of the present invention.

The above-described linear bearings 311, 312, 411, and 412, and rails 301, 302, 401, and 402 may be of any suitable conventional or special design, the details of which form no part of the broad aspects of the invention. In the illustrated preferred embodiment of the invention, the linear bearings and rails are the types sold in the U.S.A. by Schneeberger, having an office at 11 DeAngelo Drive, Bedford, Mass. 01730, U.S.A.

A sequence of operation of the machine 84 will next be described as an example of one of the ways in which the machine 84 may be used to make one or more holes in either or both legs of a structural angle, such as the structural angle 80 illustrated in FIGS. 2-5. Before the structural angle 80 is positioned in the machine 84, the punch can be moved to a maximum clearance position for accommodating the advancement of the structural angle 80 into the machine 84.

This may be necessary if the machine punch had been previously left in a position of lesser clearance. For example, FIG. 15 illustrates the condition of least clearance wherein the punch is at the closest position that the punch may have relative to the bottom of the wear plates 208. As can be seen in FIG. 15, the C-frame 280 is in its fully retracted position (i.e., its lowermost position closest to the floor) as established by operation of the Y-axis actuator 320, and that locates the punch 342 adjacent the X-axis path where the heel of the structural angle 80 (FIG. 2) would be located when the structural angle 80 is subsequently moved into the machine 84. In the fully retracted position of the C-frame 280 illustrated in FIG. 15, the drill 520 is also fully retracted (in the lowermost position relative to the floor) as established by retraction of the Y-axis actuator 320 (and retraction of the Z-axis actuator 430).

Figure 19:
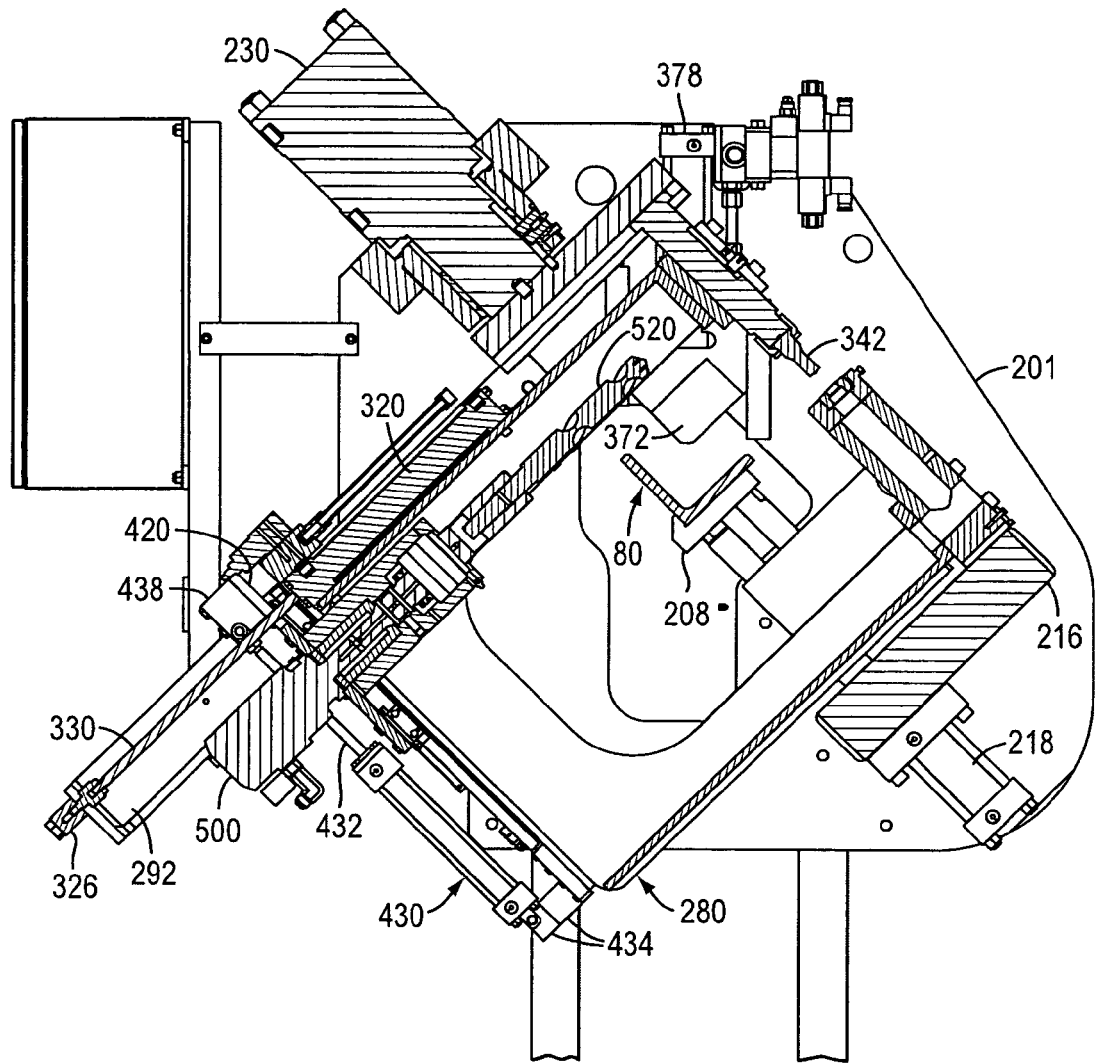
FIG. 19 is a fragmentary, cross-sectional view taken generally along the plane 19-19 in FIG. 17, and the positions of the punch press C-frame and drill carriage in FIG. 19 correspond to the fully extended positions shown in FIG. 18.
Figure 20:
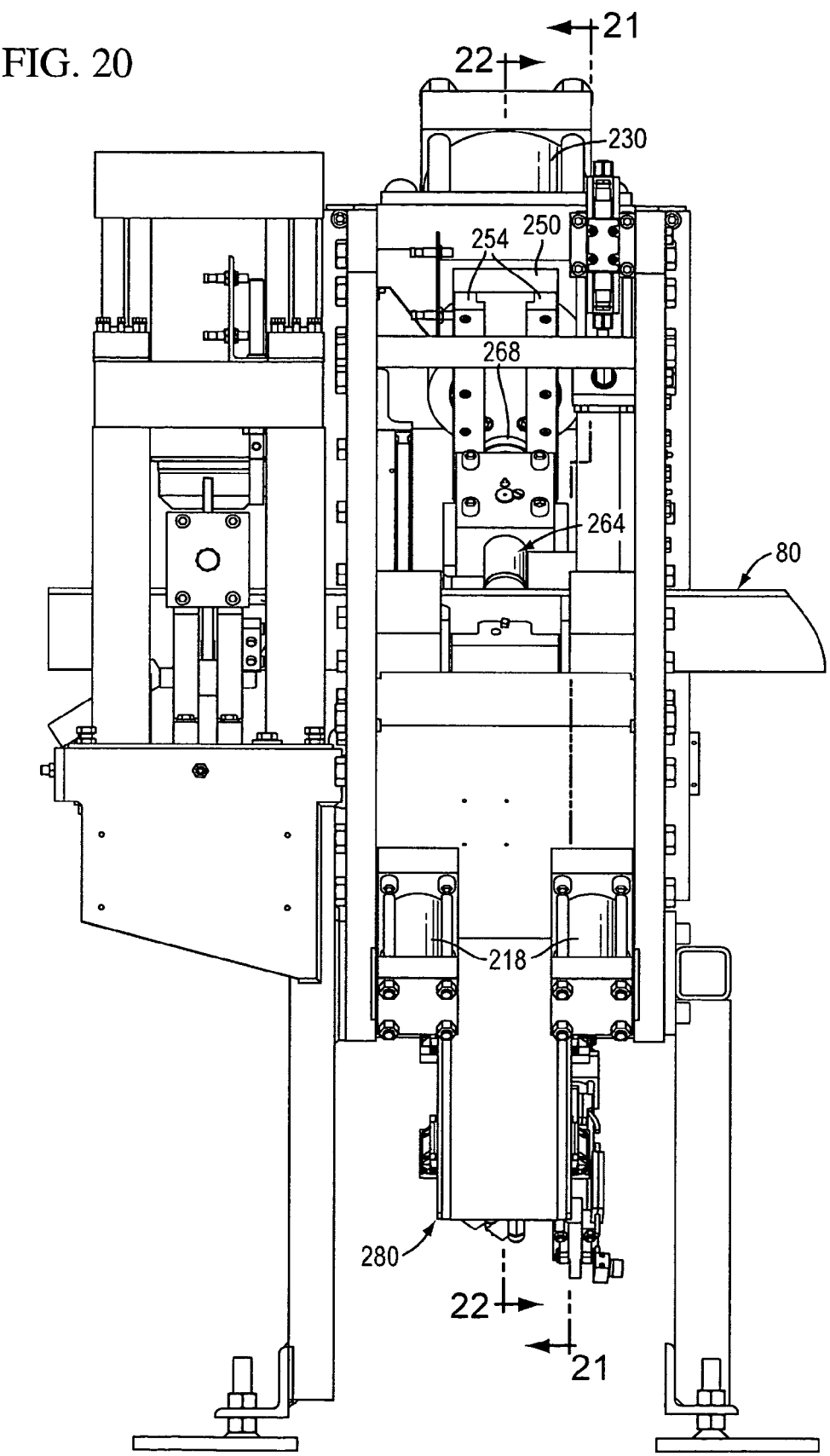
FIG. 20 is a view similar to FIG. 17, but FIG. 20 shows the punch actuated to a fully extended, punching position, and in FIG. 20 the structural angle has been shown.
Figure 21:
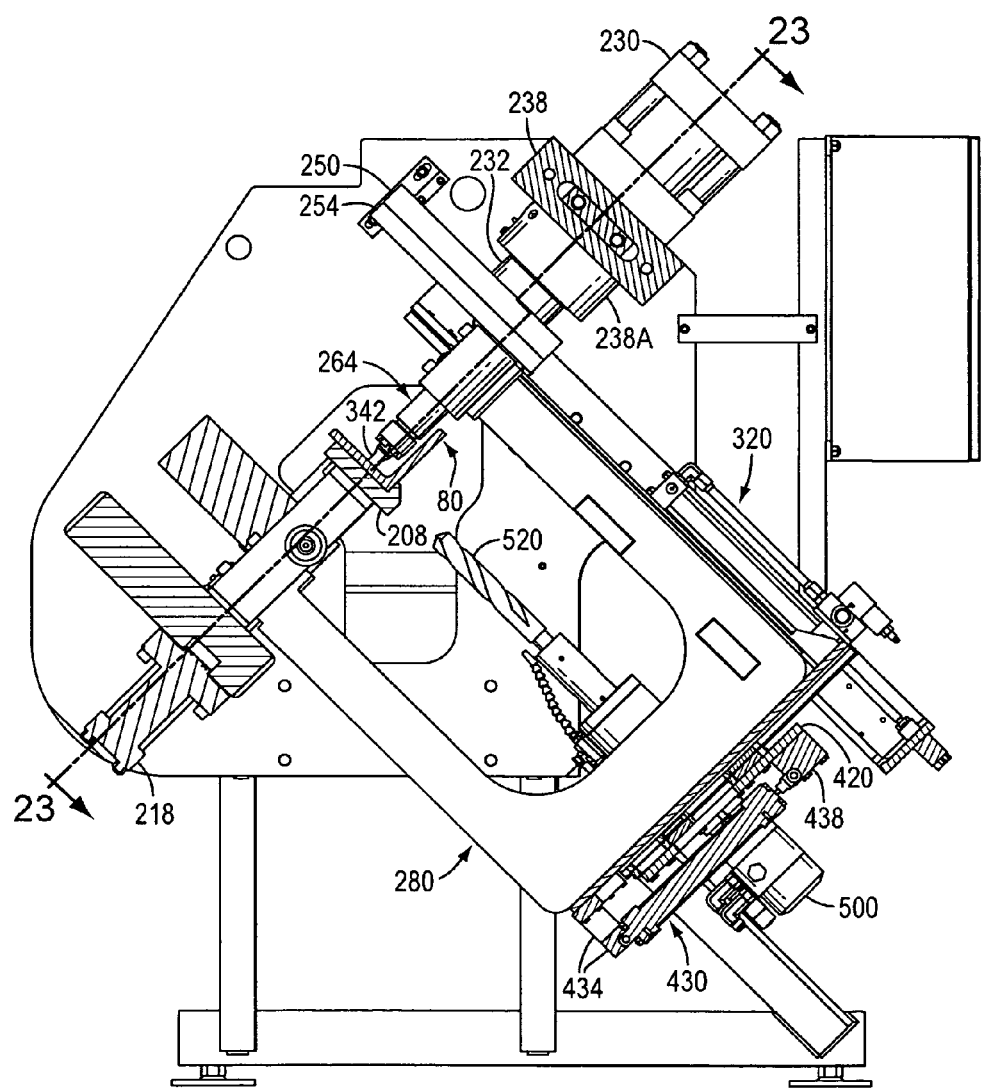
FIG. 21 is a cross-sectional view taken generally along the broken plane 21-21 in FIG. 20 wherein the punch is in the extended punching position.

The actuators 320 and 430 can be operated to move the components from a condition of at least internal clearance to a condition of maximum internal clearance. In FIGS. 18 and 19, the Y-axis actuator 320 is extended to move the punch 342 to the upper end or limit of the Y-axis travel, and the Z-axis actuator 430 is extended to move the carriage 420 (along with the drill motor 500 mounted thereon) to the end or limit of the travel in the Z-axis direction which positions the drill 520 (FIG. 19) at its furthest outward location away from the anvil wear plates 208.

With the machine 84 set to provide maximum internal clearance as discussed above, the structural angle 80 can be positioned in the machine 84. Initially, the structural angle 80 can be loaded on the angle gripping and advancing module 82, and the angle 80 is gripped by the gripper assembly 130 (FIG. 2) at an appropriate location (which may be determined by a suitable control system that can accept a sensor signal corresponding to the sensed leading end or trailing end of the structural angle 80 and that can be programmed for the hole locations along the length of structural angle or along shorter lengths of the structural angle that are to be sheared by the shear module 86 on the exit side of the punch press and drill machine 84). Any suitable conventional or special control system may be employed (or no automatic control system may be employed). However, preferably the punch press and drill machine 84 is employed in the processing system 70 that incorporates a CNC control system, such as the kind sold by Siemens having an office at 390 Kent Avenue, Elk Grove Village, Ill. 60007, U.S.A. The detailed design and operation of such a control system form no part of the present invention.

After the structural angle 80 has been positioned in the machine 84 at a desired location along the X-axis, the legs of the angle 80 can be punched and drilled. To this end, the structural angle 80 is preferably first clamped against the anvil wear plates 208 by the clamp plate 372 in response to operation of the actuator 378. FIG. 19 shows the clamp plate 372 initially elevated above the angle 80, and FIG. 22 shows the clamp plate 372 lowered to clamp the angle 80.

Figure 14:
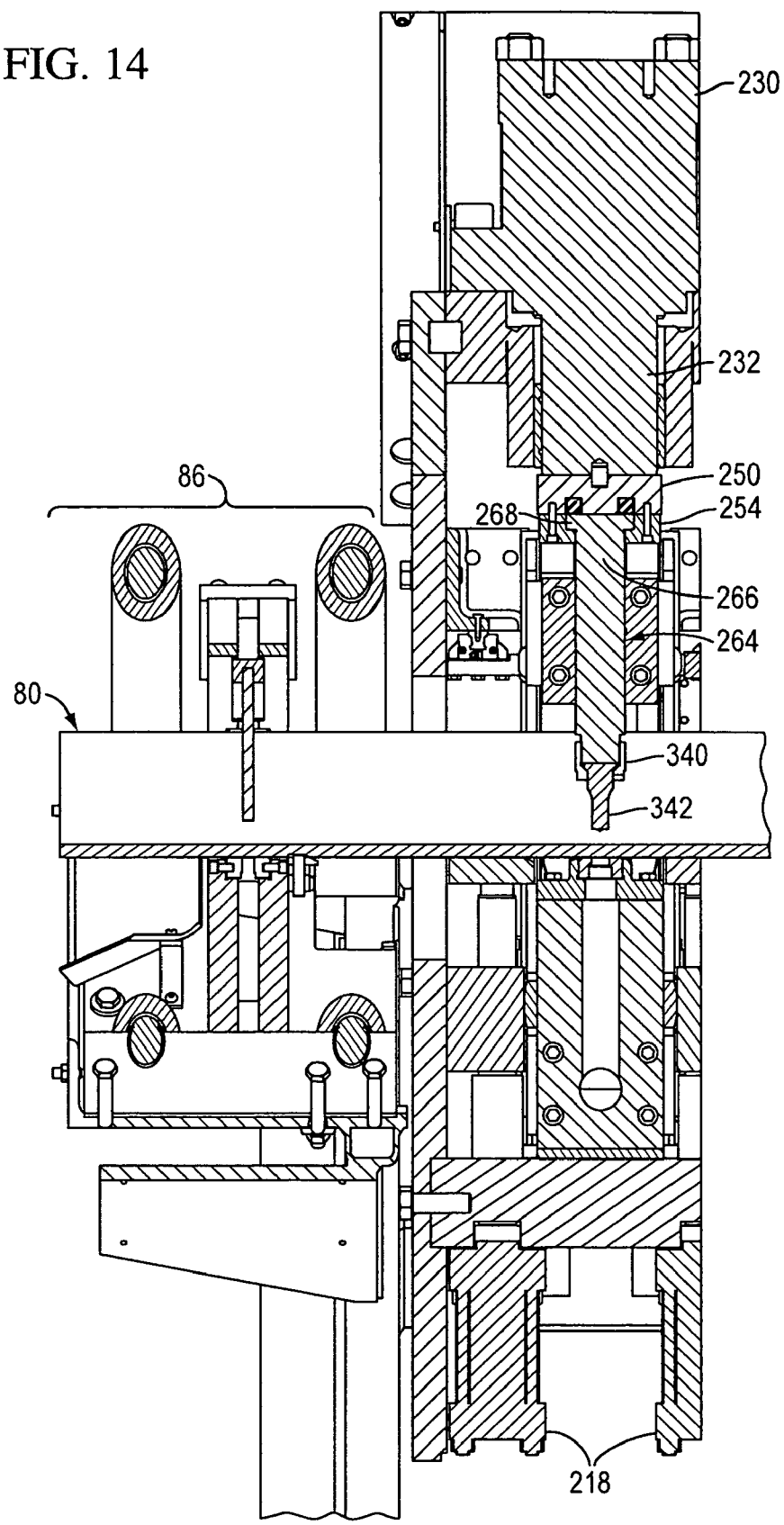
FIG. 14 is a fragmentary, cross-sectional view taken generally along the plane 14-14 in FIG. 13.

After the structural angle 80 is properly positioned and clamped within the machine 84 (or as the angle is being properly positioned and clamped), the actuators 320 and 430 can be operated as necessary to move the drill 520 and punch 342 to the desired locations. For initially punching the first hole in the first leg of the angle 80, the machine components can be positioned as shown in FIGS. 13 and 14. In FIG. 13, the C-frame 280 has been retracted a desired amount along the Y-axis so as to align the punch 342 with the first region in the first leg of the angle 80 which is to be punched. Also, as shown in FIG. 13, the Z-axis actuator 430 can be operated to establish its fully retracted condition wherein the drill 520 is at the fully retracted location along the Z-axis.

As shown in FIGS. 20-23, the punch actuator 230 is next operated to punch the angle first leg. To this end, the punch actuator 230 is operated to extend the punch 342 in the Z-axis direction through the angle 80 leg. FIGS. 20, 21, 22, and 23 show the extension of the piston 232 of the punch actuator 230. This moves the punch slide top plate 250 and side bars 254 outwardly with the ram 264 parallel to the Z-axis to move the punch 342 through the leg of the angle 80. The punch 230 is then operated in the reverse direction and to retract (strip) the punch 342 from the angle 80.

Figure 24:
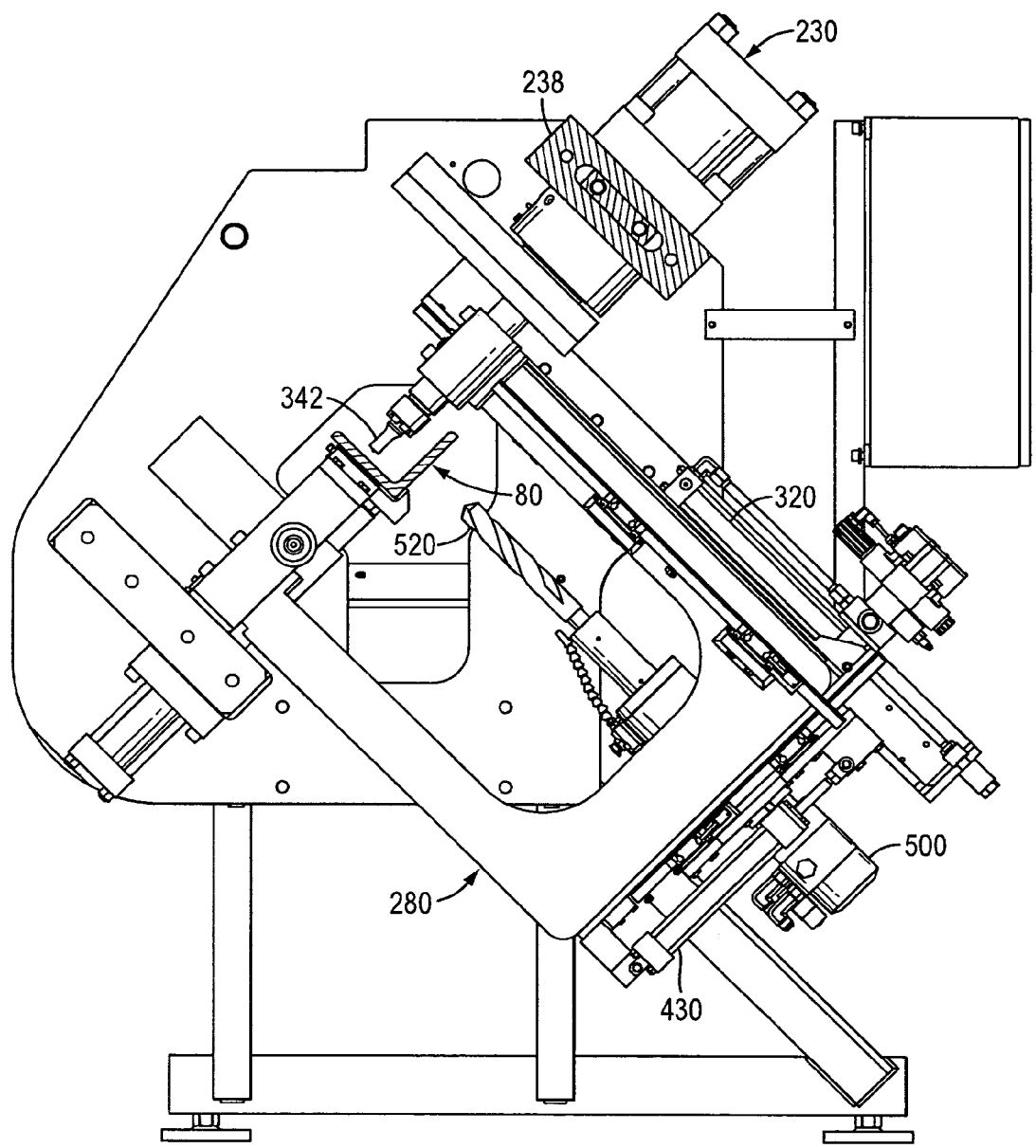
FIG. 24 is a view similar to FIG. 21, but FIG. 24 shows the punch withdrawn from the punched hole and shows the drill moved along the Z-axis to the longitudinal axis of the center of the hole to be drilled in the second leg of the angle.
Figure 25:
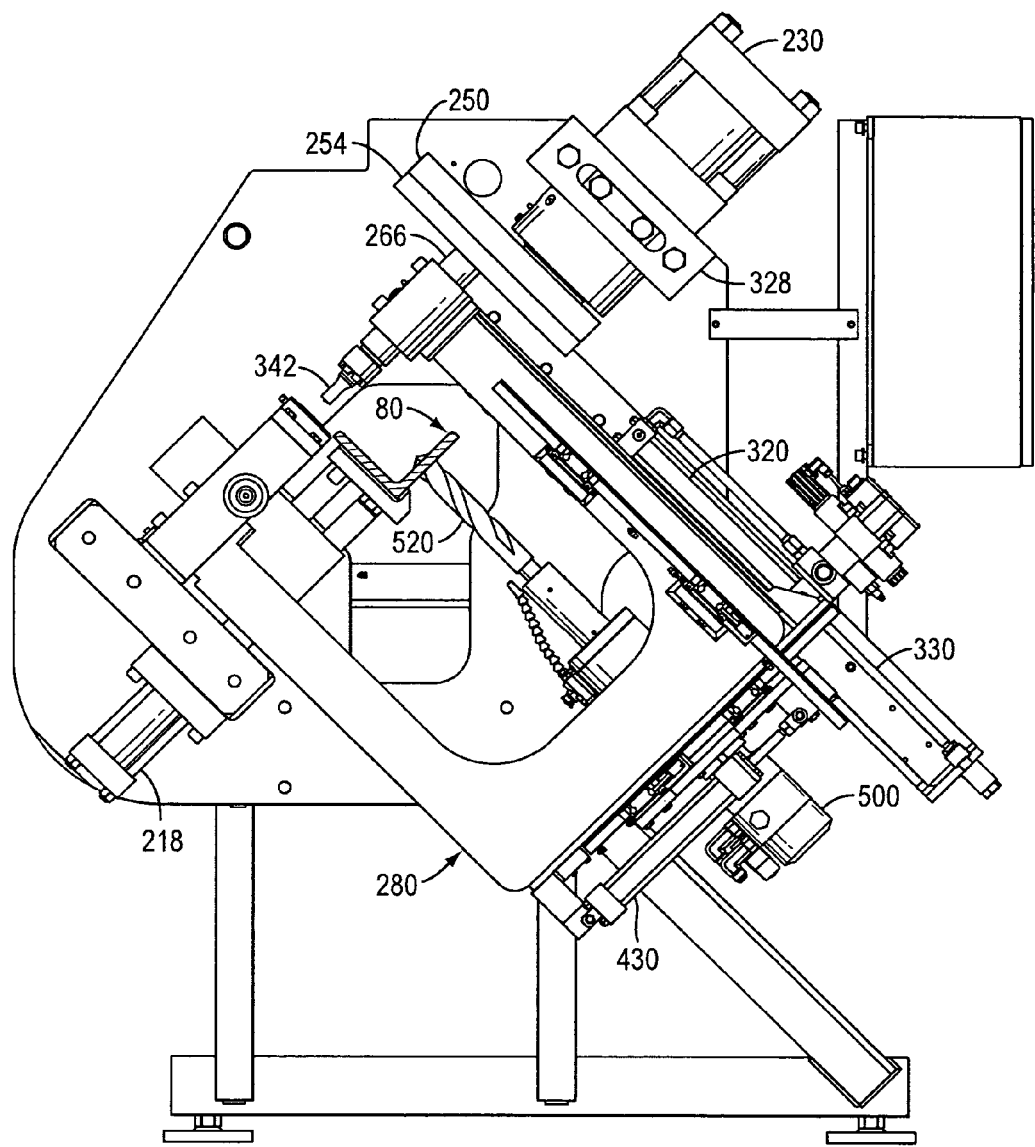
FIG. 25 is a view similar to FIG. 24, but FIG. 25 shows the drill being fed and operated to drill the hole through the second leg of the angle.

Following withdrawal and retraction of the punch 342, the drill can be moved into position for drilling the first hole in the second leg of the angle 80. As can be seen in FIG. 24, the Z-axis actuator 430 has been operated to position the drill 520 along the Z-axis at the desired location for drilling the first hole in the second leg of the angle 80. Simultaneously with the operation of the Z-axis actuator 430 (or subsequently), the Y-axis actuator 320 can be operated to rapidly advance the C-frame 280 to position the tip of the drill very near the surface of the angle second leg. Then the hole can be drilled in the angle second leg as shown in FIG. 25. The drilling is accomplished by operating the Y-axis actuator 320 to extend the actuator piston 330 at a rate corresponding to the desired drill feed rate while the drill motor 500 is operated to rotate the drill 520. After the hole is drilled, the Y-axis actuator 320 can be operated in the reverse direction to retract the drill 520. The system can then be operated to position the punch or drill as desired to make another hole in one of the legs of the angle 80.

Because the punch 342 and drill 520 are "in-line," a first hole can be punched in the angle first leg by the punch 342, and a second hole can be drilled in the angle second leg by the drill 520 without changing the X-axis location of the punch 342 and drill 520 between the punching and drilling steps. Further, the drill 520 can be fed while drilling in the Y-axis direction by the same actuator that moves the punch into position in the Y-axis direction (i.e., the Y-axis actuator 320). Further, the same Y-axis actuator 320 can first rapidly move the drill motor 500 and drill 520 along the Y-axis to a location where the tip of the drill 520 is adjacent the surface of the angle leg, and the Y-axis actuator 320 can then move the drill forward more slowly while drilling. These actions are, of course, readily controlled by an automatic control system. However, the above-described benefits and advantages of the system of the present invention can be realized even if an automatic control system is not used, and the components are instead manually (or semi-automatically) moved and operated as described above.

Because the punch 342 is incorporated in the machine 84, non-circular holes can be made by using a punch having the desired, non-circular configuration. Such non-circular holes could be separately punched in one or both legs of the angle by, if necessary, removing the angle from the machine, and then re-positioning the angle in the machine with the appropriate leg adjacent the punch.

The machine 84 is versatile because, among other things, the machine permits repositioning of the angle within the machine to punch, rather than drill, some or all of the holes in each of the legs (regardless of whether the punch is non-circular or circular). Further, because the drill can be used to drill holes in either leg of the angle (by removing and repositioning the angle, if necessary), holes can be drilled in either leg of the angle at locations that would be difficult, if not impossible, to punch.

In general, the machine of the present invention is versatile because it permits re-positioning of the angle with either leg adjacent the drill or with either leg adjacent the punch so that some or all of the holes in each leg can be either drilled or punched. Moreover, in situations where it is difficult to punch a hole in an angle leg (where the hole is to be made very close to the other leg or where the hole diameter is smaller than the angle leg thickness), the machine can be used to make such holes solely with the drill.

In the preferred form of the present invention, wherein one punch and one drill are employed along a common plane, the machine can be made relatively small in the X-axis direction (along the length of the structural angle) because two side-by-side punches are not employed.

It will also be appreciated that in another form of the invention (not illustrated), the fixed support frame 94 (FIGS. 2 and 3) could be modified to be a movable frame for moving the invention machine 84 (and attached shear module 86, if any) along the X-axis while the structural angle 80 is held stationary Such an arrangement could be controlled for automatic operation without requiring a gripper carriage (like the assembly 130 in FIGS. 2 and 3) to also be movable along the X-axis.

Further, although not illustrated, the invention machine 84 could be provided with additional punches and drills in aligned pairs each comprising one additional punch aligned with one corresponding additional drill in a manner analogous to the illustrated punch 342 and drill 520.

It will be readily apparent from the foregoing detailed description of the invention and from the illustrations thereof that numerous variations and modifications may be effected without departing from the true spirit and scope of the novel concepts or principles of this invention.

What is claimed is:

1. A machine for creating holes in the first and second legs of a structural angle oriented lengthwise along the X-axis of a mutually orthogonal X, Y, and Z-axis coordinate system, said machine comprising:
    a first frame;
    a second frame mounted to said first frame for movement along the Y-axis relative to said first frame;
    a movable carriage mounted on said second frame for movement along the Z-axis relative to said first frame;
    a punch on said second frame for punching a first hole in the first leg of said angle;
    a drill on said carriage for drilling a second hole in the second leg of said angle;
    said punch having a punch operation axis along which the punch moves longitudinally to punch said first hole and which is parallel to the Z-axis;
    said drill having a drill feed operation axis along which the drill moves longitudinally to drill said second hole and which is parallel to the Y-axis; and
    said drill and said punch being oriented with the drill feed operation axis and the punch operation axis together defining a common plane.

2. The machine in accordance with claim 1 in which
    said machine defines a processing path along which the structural angle can be moved along the X-axis through the machine;
    said first frame is stationary;
    said first frame includes an entry side plate and an exit side plate that are (1) spaced-apart, (2) parallel to each other, and (3) perpendicular to the X-axis; and
    each said first frame entry side plate and exit side plate has an opening generally aligned with the opening in the other plate at said processing path to accommodate passage therethrough of said structural angle.

3. The machine in accordance with claim 2 in which
    said second frame includes a generally U-shaped portion having an entry side and an exit side;
    a linear rail is mounted to said first frame entry side plate;
    a linear rail is mounted to said first frame exit side plate;
    said linear rails are oriented lengthwise parallel to the Y-axis and perpendicular to the Z-axis and to the X-axis;
    at least one linear bearing is mounted to said entry side of said second frame and slidably engaged with said linear rail mounted to said first frame entry side plate; and
    at least one linear bearing is mounted to said exit side plate of said second frame and slidably engaged with said linear rail mounted to said first frame exit side plate.

4. The machine in accordance with claim 3 in which
    said second frame U-shaped portion has two, spaced-apart legs that each extend generally parallel to the Y-axis; and
    said punch is mounted to the distal end of one of said legs with the punch operation axis perpendicular to the Y-axis.

5. The machine in accordance with claim 1 in which
    said second frame includes a punch slide block defining a bore having a longitudinal axis parallel to said Z-axis;
    said machine includes a punch actuator support that (1) is mounted to said first frame, and (2) defines a bore;
    said machine includes a punch hydraulic piston/cylinder actuator having a piston that (1) is slidably disposed in said punch actuator support bore, and (2) has a distal end;
    said machine includes a guide that (1) is mounted to said distal end of said piston of said punch hydraulic piston/cylinder actuator, and (2) defines a guideway slot that
        (a) extends lengthwise parallel to said Y-axis, and
        (b) has a T-shaped transverse cross-section defining a narrow channel and a wide channel; and
    said machine includes a coupling nut connecting the proximal end of said punch to the distal end of a ram which has a shaft that (a) has a portion that is slidably received in said punch slide block bore and that has a proximal portion projecting from said slide block bore through said guideway narrow channel, and (b) has an enlarged base on the proximal end of said shaft proximal portion received in said guideway slot wide channel to accommodate movement of said ram along the Y-axis when said second frame is moved along the Y-axis.

6. The machine in accordance with claim 1 in which
    said machine includes a pair of drill support rails that (1) are oriented lengthwise parallel to the Z-axis, and (2) are mounted to said second frame;
    said machine has linear bearings that are (1) slidably disposed on said drill support rails, and (2) attached to said carriage;
    said drill includes a drill bit operably connected to a drill motor carried on said carriage; and
    said machine includes a Z-axis hydraulic piston/cylinder actuator having (1) a cylinder connected to said second frame, and (2) a piston connected to said carriage.

7. The machine in accordance with claim 1 in which said machine includes a Y-axis hydraulic piston/cylinder actuator having a cylinder mounted to said second frame and a piston connected to said first frame.

8. A machine for creating holes in the first and second legs of a structural angle oriented lengthwise along the X-axis of a mutually orthogonal X, Y, and Z-axis coordinate system, said machine comprising:
    a pair of parallel, spaced-apart, first and second side plates defining a stationary first frame, each said side plate defining an opening generally aligned along the X-axis with the opening in the other said side plate to accommodate passage therethrough of said structural angle;

a second frame mounted to said first frame side plates for movement along the Y-axis relative to said first frame, said second frame including a punch slide block defining a bore having a longitudinal axis parallel to said Z-axis;

a movable carriage mounted on said second frame for movement along the Z-axis relative to said first frame;

a punch on said second frame for punching a first hole in the first leg of said angle;

a drill on said carriage for drilling a second hole in the second leg of said angle;

said punch having a punch operation axis along which the punch moves longitudinally to punch said first hole and which is parallel to the Z-axis;

said machine including a punch actuator support that (1) is mounted to said first frame, and (2) defines a bore;

said machine including a punch hydraulic piston/cylinder actuator having a piston rod that (1) is slidably disposed in said punch actuator support bore, and (2) has a distal end;

said machine including a guide that (1) is mounted to said distal end of said piston rod of said punch hydraulic piston/cylinder actuator, and (2) defines a guideway slot that
 (a) extends lengthwise parallel to said Y-axis, and
 (b) has a T-shaped transverse shape defining a narrow channel and a wide channel;

said machine including a ram defining a shaft having (1) a distal end connected to said punch, (2) a portion that is slidably received in said punch slide block bore, (3) a proximal portion projecting from said slide block bore through said guideway narrow channel, and (4) an enlarged base on the proximal end of said shaft proximal portion received in said guideway slot wide channel to accommodate movement of said ram along the Y-axis when said second frame is moved along the Y-axis;

said drill having a drill feed operation axis along which the drill moves longitudinally to drill said second hole and which is parallel to the Y-axis; and said drill and said punch being oriented with the drill feed operation axis and the punch operation axis together defining a common plane.

9. The machine in accordance with claim 8 in which said machine defines a processing path along which the structural angle can be moved along the X-axis through the machine; and said first frame is stationary.

10. The machine in accordance with claim 8 in which said second frame has a U-shaped portion defining two, spaced-apart legs that each extend generally parallel to the Y-axis; and said punch is mounted to the distal end of one of said legs with the punch operation axis perpendicular to the Y-axis.

11. The machine in accordance with claim 8 in which said machine includes a pair of drill support rails that (1) are oriented lengthwise parallel to the Z-axis, and (2) are mounted to said second frame;

said machine has linear bearings that are (1) slidably disposed on said drill support rails, and (2) attached to said carriage;

said drill includes a drill bit operably connected to a drill motor carried on said carriage; and said machine includes a Z-axis hydraulic piston/cylinder actuator having (1) a cylinder connected to said second frame, and (2) a piston connected to said carriage whereby operation of said Z-axis hydraulic piston/cylinder actuator moves said carriage relative to said second frame parallel to said Z-axis.

12. The machine in accordance with claim 8 in which said machine includes a Y-axis hydraulic piston/cylinder actuator having a cylinder mounted to said second frame and a piston connected to said first frame whereby operation of said Y-axis hydraulic piston-cylinder actuator moves said second frame relative to said first frame parallel to said Y-axis.

* * * * *